(12) United States Patent
Kane

(10) Patent No.: US 6,219,142 B1
(45) Date of Patent: Apr. 17, 2001

(54) METHOD AND APPARATUS FOR DETERMINING WAVE CHARACTERISTICS FROM WAVE PHENOMENA

(75) Inventor: Daniel J. Kane, Santa Fe, NM (US)

(73) Assignee: Southwest Sciences Incorporated, Santa Fe, NM (US)

( * ) Notice: Subject to any disclaimer, the term of this patent is extended or adjusted under 35 U.S.C. 154(b) by 0 days.

(21) Appl. No.: 09/174,080

(22) Filed: Oct. 16, 1998

Related U.S. Application Data

(60) Provisional application No. 60/063,745, filed on Oct. 17, 1997.

(51) Int. Cl.$^7$ ........................................ G01B 9/02
(52) U.S. Cl. ............................................. 356/450
(58) Field of Search ................................. 356/450, 451

(56) References Cited

U.S. PATENT DOCUMENTS

| | | |
|---|---|---|
| 4,792,230 | 12/1988 | Naganuma et al. . |
| 5,253,192 | 10/1993 | Tufts . |
| 5,367,375 | 11/1994 | Siebert . |
| 5,530,544 | 6/1996 | Trebino et al. . |
| 5,684,586 | 11/1997 | Fortenberry et al. . |
| 5,754,292 | 5/1998 | Kane et al. . |

OTHER PUBLICATIONS

Stark, H., editor Textbook: "Image Recovery: Theory and Application," Academic Press Inc., Harcourt Brace Javanovich Publishers, chapter 8, pp 277–320 (1987).

Sweetser, J.N., "Transient–Grating Frequency–Resolved Optical Gating," *Optics Letters*, vol. 22, No. 8, pp 519–521 (Apr. 15, 1997).

Szabo, G., et al., "A Sensitive Single Shot Method to Determine Duration and Chirp of Ultrashort Pulses with a Streak Camera," *Optics Comm.*, vol. 82, No. 1.2 pp 56–62 (Apr. 1, 1991).

Taylor, A.J., et al., "Determination of $n_2$ by Direct Measurement of the Optical Phase, " *Optics Letters*, vol. 21, No. 22 pp 1812–1814 (Nov. 15, 1996).

Treacy, E.B., "Measurement and Interpretation of Dynamic Spectrograms of Picosecond Light Pulses," *J applied Physics*, vol. 42, No. 10, pp 3848–3858 (Sep. 1971).

Trebino, R., et al., "Measuring Ultrashort Laser Pulses in the Time–Frequency Domain Using Frequency–Resolved Optical Gating," *Rev. Sci, Instrum.*, vol. 68 No. 9, pp 3277–3295 (Sep. 1997).

Trebino, R., et al., "Chirp and Self–Phase Modulation in Induced–Gating Autocorrelation Measurements of Ultrashort Pulses," *Optics Letters*, vol. 15, No. 19, pp 1079–1081 (Oct. 1, 1990).

Trebino, R., et al., "Using Phase Retrieval to Measure the Intensity and Phase of Ultrashort Pulses: Frequency–Resolved Optical Gating," *J. Opt Soc. Am. A.*, vol. 10, No. 5, pp 1101–1111 (May 1993).

Wong, V., et al., "Linear Filter Analysis of Methods for Ultrashort–Pulse–Shape Measurements," *J. Opt. Soc. Am. B*, vol. 12, No. 8, pp 1491–1499 (Aug. 1995).

Yan, C., et al., "Amplitude and Phase Recording of Ultrashort Pulses," *Opt. Soc. Am. B.*, vol. 8, No. 6, pp 1259–1263 (Jun. 1991).

(List continued on next page.)

Robert Kim
*Assistant Examiner*—Andrew H. Lee
(74) *Attorney, Agent, or Firm*—Jeffrey D. Myers; Brian J. Pangrle

(57) ABSTRACT

An apparatus and method for determining wave characteristics from wave phenomena. The apparatus and method employ eigenvectors to yield a variety of wave characteristics from wave phenomena data.

21 Claims, 10 Drawing Sheets

OTHER PUBLICATIONS

Yang, Y., et al., "Projection–Based Blind Deconvolution," *J. Opt. Soc. Am. A.*, vol. 11, No. 9, pp 2401–2409 (Sep. 1994).

Yudilevich, E., "Restoration of Signals from their Signed Fornier–Transform Magnitude by the Method of Generalized Projections," *J. Opt. Soc. Am. A*, vol. 4, No. 1, pp 236–246 (Jan. 1987).

Naganuma, K., et al., "General Method for Ultrashort Light Pulse Chirp Measurement," *IEEE J Quantum Elec*, vol. 25, No. 6, pp 1225–1233 (Jun. 1989).

Nawab, S.H., et al., "Signal Reconstruction from Short–Time Fourier Transform Magnitude," *IEEE Trans. Acoustics., Speech, and signal Processing*, vol. ASSP–31, No. 4, pp 986–998 (Aug. 1983).

Paulter, Jr., N.G., et al., "A New Triple Correlator Design for the Measurement of Ultrashort Laser Pulses," *Optics Communications*, vol. 81, No. 1.2 pp 95–100 (Feb. 1, 1991).

Paye, J., et al., "Measurement of the amplitude and Phase of Ultrashort Light Pulses from Spectrally Resolved Autocorrelation," *Optics Letters*, vol. 18, No. 22 pp 1946–1948 (Nov. 15, 1993).

Press, W.H., et al., Textbook "Numerical Recipes in Fortran—The Art of Scientific Computing," Second Ed., Cambridge U. Press, Chap 1.6 "Singular Value Decomposition" pp 51–63 (1992).

Reid, D.T., et al., "Light–Emitting Diodes as Measurement Devices for Femtosecond Laser Pulses," *Optics Letters*, vol. 22, No. 4, pp 233–235 (Feb. 15, 1997).

Reynaud, F., et al., "measurement of Phase shifts Introduced by Nonlinear Optical Phenomena on Subpicosecond Pulses," *Optics Letters*, vol. 14, No. 5, p 275–277 (Mar. 1, 1989).

Rhee, J–K., et al., "Real–Time Dispersion analyzer of Femtosecond laser Pulses with Use of a Spectrally and Temporally Resolved Upconversion Technique," *J. Opt. Soc. Am. B*, vol. 13, No. 8 pp 1780–1785 (Aug. 1996).

Rothenberg, J.E., et al., "Measurement of Optical Phase with Subpicosecond Resolution by Time–Domain Interferometry," *Optics Letters*, vol. 12, No. 2, pp 99–101 (Feb. 1987).

Siders, C.W., et al., "Multipulse Interferometric Frequency–Resolved Optical Gating: Real–Time PhaseSensitive Imaging of Ultrafast Dynamics," *Optics Letters*, vol. 22, No. 9 pp 624–626 (May 1, 1997).

Kane, D.J., et al., "Simultaneous Measurement of Two Ultrashort Laser Pulses from a Single Spectogram in a Single Shot," *J. Opt. Soc. Am. B*, vol. 14, No. 4, pp 935–943 (Apr. 1997).

Kane, D.J., et al., "Single–Shot Measurement of the Intensity and Phase of a Femtosecond UV Laser Pulse with Frequency–Resolved Optical Gating," *Optics Letters*, vol. 19, No. 14, pp 1061–1063 (Jul. 15, 1994).

Kane, D.J., et al., "Characterization of Arbitrary Femtosecond Pulses Using Frequency–Resolved Optical Gating," *J. Quantum Elec.*, vol. 29, No. 2, pp 571–579 (Feb. 1993).

Kane, D.J., et al., Single–Shot Measurement of the Intensity and Phase of an Arbitrary Ultrashort Pulse by Using Frequency–Resolved Optical Gating, *Optics letters*, vol. 18, No. 10, pp 823–825 (May 15, 1993).

Kobayashi, T., et al., "Novel Method of Waveform Evaluation of Ultrashort Optical Pulses," *Ultrafast Phenomena IV*, D.H. Auston and K.B. Eisenthal, Eds., Berlin:Srpinger–Verlag pp 93–95 (1984).

Kohler, B., et al., "Phase and Intensity Characterization of Femtosecond Pulses from a Chirped–Pulse Amplifier by Frequency–Resolved Optical Gating," *Optics Letters*, vol. 20, No. 5, pp 483–485 (Mar. 1, 1995).

Manassah, J.T., et al., "Direct and Second Harmonics Interferometric Determination of Chirped Pulse Parameters," *Applied Optics*, vol. 26, No. 15, pp 2941–2942 (Aug. 1, 1987).

McCallum, B.C., et al., "Simultaneous Reconstruction of Object and Aperture Functions from Multiple Far–Field Intensity Measurements," *J. Opt. Soc. Am. A*, vol. 10, No. 2, pp 231–239 (Feb. 1993).

Naganuma, K., et al., "Time Direction Determination of Asymmetric Ultrashort Optical Pulses from Second–Harmonic Generation Autocorrelation Signals," *Appl. Phys. Lett.*, vol. 54, No. 13 pp 1201–1202 (Mar. 27, 1989).

Dorrer, C., et al., "Phase–amplitude coupling in Spectral Phase Modulation," *Laboratoire d'Optique Appliquee*, 4 pp Ultra Fast Optics, Monterey CA Aug. 4–7, 1997.

Fork, R.L., et al., "compression of Optical Pulses to Six Femtoseconds by Using Cubic Phase Compensation," *Optics Letters*, vol. 12, No. 7, pp 483–485 (Jul. 1987).

Fork, R.L., et al., "Femtosecond White–Light continuum Pulses," *Optics Letters*, vol. 8, No. 1, pp 1–3 (Jan. 1983).

Giordmaine, J.A., et al., "Two–Photon Ecxitation of Fluorescence by Picosecond Light Pulses," *Applied Physics Letters*, vol. 11, No. 7, pp 216–218 (Oct. 1, 1967).

Gomes, A.S.L., et al., "Direct Measurement of Nonlinear Frequency Chirp of Raman Radiation in Single–Mode Optical Fibers Using a Spectal Window Method," *J. Opt. Soc. Am. B*, vol. 5, No. 2, pp 373–379 (Feb. 1988).

Ippen, E.P., et al., "Techniques for Measurement," Chapter 3 from Textbook, S.L. Shapiro, Editor, Berlin: Springer–Verlag, pp 83–122 (1977).

Jain, A.K., "Fundamentals of Digital Image Processing, "Second Ed. (1992) Prentice hall, Englewood Cliffs, NJ pp 176–180.

Janszky, J., et al., "Full Intensity Profile Analysis of Ultrashort laser Pulses Using Four–Wave Mixing or Third harmonic Generation," *Optics Comm.*, vol. 60, No. 4, pp 251–256, (Nov. 15, 1986).

Kane, D.J., "Real–Time Measurement of Ultrashort Laser Pulses Using Principal component Generalized Projections," *IEEE J Selected Topics in Quantum Elec.*, vol. 4, No. 2, pp 278–284 (Mar./Apr. 1998).

Clement, T.S., et al., "Single–Shot measurment of the Amplitude and Phase of Ultrashort laser Pulses in the Violet," *Optics Letters* reprint, vol. 20, No. 1, pp 70–72 (Jan. 1, 1995).

Cohen, L., "Time—Frequency distributions—A Review," *Proc of the IEEE*, vol. 77, No. 7, pp 941–981 (Jul. 1989).

DeLong, K.W., et al., "Pulse Retrieval in Frequency–Resolved Optical Gating Based on the Method of Generalized Projections," *Optics Letters*, vol. 19, No. 24, pp 2152–2154 (Dec. 15, 1994).

DeLong, K.W., et al., "Ultrashort–Pulse Measurement Using Noninstantaneous Nonlinearities: Raman Effects in Frequency–Resolved Optical Gating," *Optics Letters*, vol. 20, No. 5, pp 486–488 (Mar. 1, 1995).

DeLong, K.W., et al., "Improved Ultrashort Pulse–Retrieval Algorithm for Frequency–Resolved Optical Gating," *J. Opt. Soc. Am. A*, vol. 11, No. 9, pp 2429–2437 (Sep. 1994).

DeLong, K.W., et al., "Frequency–Resolved optical Gating with the Use of Second–harmonic Generation," *J. Opt. Soc. Am. B.*, vol. 11, No. 11, pp 2206–2215 (Nov. 1994).

DeLong, et al., "Comparison of Ultrashort–Pulse Frequency–Resolved–Optical–Gating Traces for Three common Beam Geometries," *Opt. Soc. of Am. B,* vol. 11, No. 9 pp 1595–1608 (Sep. 1994).

DeLong, et al., "Simultaneous Recovery of Two Ultrashort Laser Pulses from Single Spectrogram," *J. Opt. Soc. Am.B,* vol. 12, No. 12, pp 2463–2466 (Dec. 1995).

DeLong, K.W., et al., "Chirped Light and Its Characterization Using the Cross–correlation Technique," *J. Opt. Soc. Am. B.,* vol. 9, No. 9, pp 1593–1604 (Sep. 1992).

Diels, J–C.M., ET AL., "Control and Measurement of Ultrashort Pulse Shapes (in Amplitude and Phase) with Femtosecond Accuracy," *Applied Optics*, vol. 24, No. 9, pp 1270–1282 (May 1, 1985).

Albrecht, T.F., et al., "Chirp Measurement of Large–Bandwidth Femtosecond Optical Pulses Using two–Photon Absorption," *Optics Communications,* vol. 84, No. 5.5, pp 223–227 (Aug. 1, 1991).

Altes, R.A., "Detection, Estimation, and Classification with Spectrograms," *J. Acoust. Soc. Am.,* vol. 67 No. 4, pp 1232–1246 (Apr. 1980).

Anton, H., Textbook "Elementary Linear Algebra," Second Edition John Wiley & Sons for Drexel University, pp 303–310 (1977).

Backus, S., et al., "16–fs, 1–$\mu$J Ultraviolet Pulses Generated by Third–Harmonic Conversion in Air," *Optics Letters,* vol. 21, No. 9, pp 665–667 (May 1, 1996).

Basov. N.G., et al., "Measurement of the Duration of High–Power Ultrashort Optical Pulses," *Soc. J. Quantum Electron.,* vol. 15, No. 10, pp 1429–1431 (Oct. 1985).

Bolton, P.R., et al., "Propagation of Intense, Ultrashort Laser Pulses Through Metal Vapor: Refraction–Limited Behavior for Single Pulses," *J. Opt. Soc of Am.B.,* vol. 13, No. 2, pp 336–346, (Feb. 1996).

Chilla, J.L.A., et al., "Frequency of Domain Phase Measurement of Ultrashort Light Pulses—Effect of Noise" *Optics Communications,* vol. 89, No. 5.6, pp 434–440 (May 15, 1992).

Chilla, J.L.A., et al., "Analysis of a Method of Phase Measurement of Ultrashort Pulses in the Frequency Domain," *IEEE J. of Quantum Elec.,* vol. 27, No. 5, 8 pp (May 1991).

Chilla, J.L.A., et al., "Direct Determination of the Amplitude and the Phase of Femtosecond Light Pulses," *Optics Letters,* vol. 16, No. 1, pp 39–41 (Jan. 1, 1991).

Chu, K.C., et al., "Direct Measurement of the Spectal Phase of Femtosecond Pulses," *Optics Letters*, vol. 20, No. 8, pp 904–906 (Apr. 15, 1995).

*Primary Examiner—*

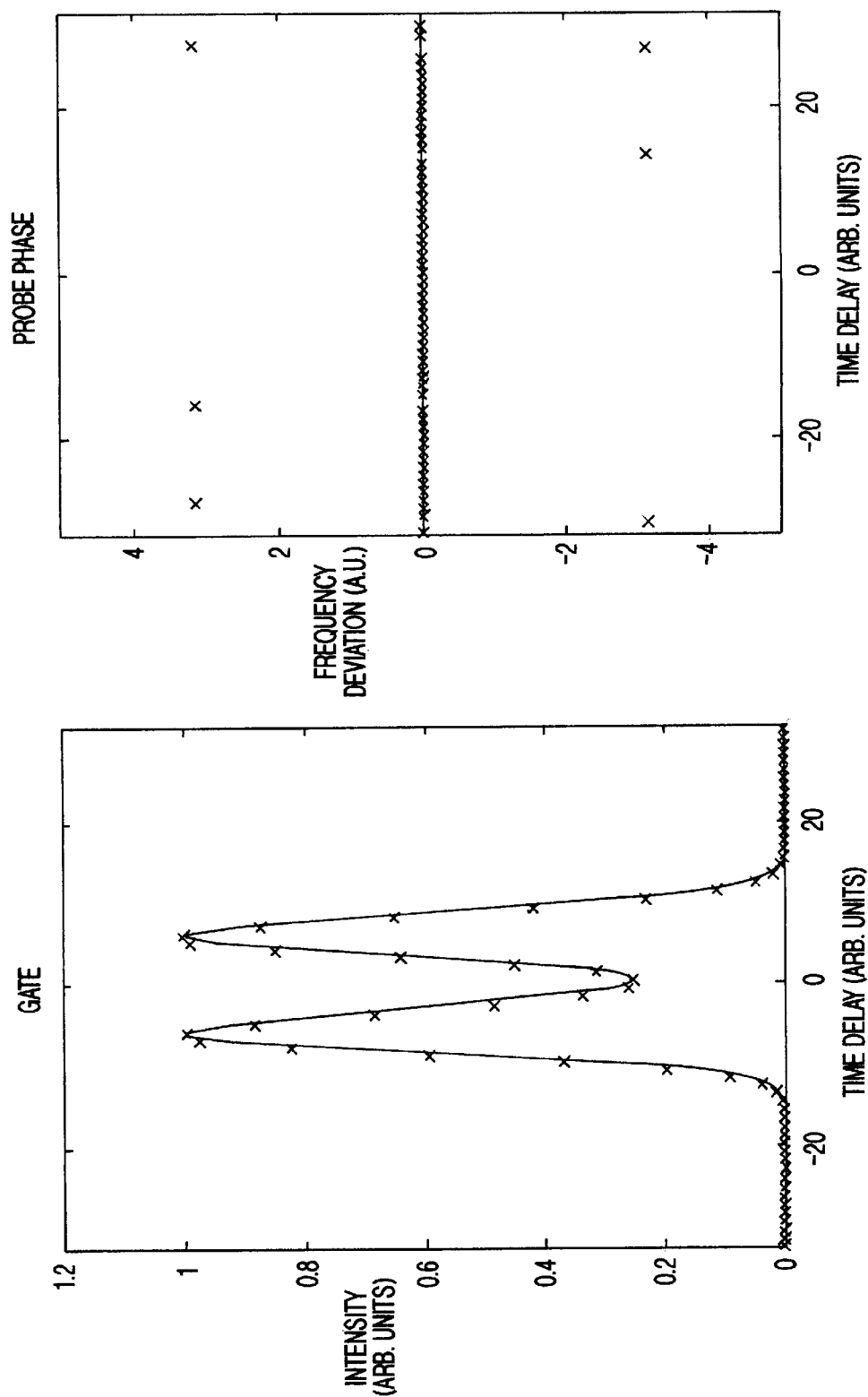

METHOD AND APPARATUS FOR DETERMINING WAVE CHARACTERISTICS FROM WAVE PHENOMENA

This application claims the benefit of U.S. Provisional Application Ser. No. 60/063,745 Oct. 17, 1997.

GOVERNMENT RIGHTS

The U.S. Government has a paid-up license in this invention and the right in limited circumstances to require the patent owner to license others on reasonable terms as provided for by the terms of Contracts No. DMI 9661596, DMI 9361715, and DMI 9801116 awarded by the National Science Foundation and No. F33615-96-C-2632 awarded by the United States Air Force.

CROSS-REFERENCE TO RELATED APPLICATIONS

This application claims the benefit of the filing of U.S. Provisional Patent Application Serial No. 60/063,745, entitled "Method and Apparatus for the Phase Retrieval of Multidimensional Spectrograms and Sonograms," filed on Oct. 17, 1997, and the specification thereof is incorporated herein by reference.

BACKGROUND OF THE INVENTION

1. Field of the Invention (Technical Field)

The present invention relates to phase retrieval in wave phenomena. The technical field of this invention is multidimensional phase retrieval. The preferred embodiment of this invention applies to ultrafast laser diagnostics.

2. Background Art

Interference phenomena are produced through the interaction of at least two spatially distinguishable waves. Sometimes diffraction and interference are not clearly distinguished. Interference occurs when two or more wavefronts interact while diffraction occurs naturally when a single wave is limited in some way. The nature of an interference pattern depends on several factors including the amplitudes and phases of the incoming waves. If the incoming waves are in phase, then the amplitude of the waves may add whereas, if the phase of the incoming waves are separated by 180°, then cancellation will result. These phenomena, the adding and canceling of amplitude, are typically referred to as constructive and destructive interference. For example, if light from a single laser is split such that it produces two separate beams, and these beams travel two different paths, then it is likely that the beams are no longer in phase or phase coherent. If the two beams are then recombined, the resulting image will be an interference pattern. In some instances, it is helpful to detect the interference pattern as an image in a plane or on a planar surface. However, the interference pattern can also be captured as intensity (absolute value of amplitude squared) versus time. The intensity versus time curve, resulting from the interference between the two beams, can be reconstructed if the individual frequency components are known i.e., amplitudes and phases.

Phase differences in the interference waves can be represented as shifts in origin. For example, the Fourier transform of a function $f(x)$ (which converts a wave from amplitude as a function of time or space to amplitude as a function of frequency) is as follows:

$$F(k) = \int f(x) \exp(-ikx) dx \quad (1)$$

where the limits on the integral are from $x=-\infty$ to $x=+\infty$. When the origin, or phase, is shifted, the Fourier transform is represented as, $$F_1(k) = \int f(x-x_o) \exp(-ikx) dx \quad (2)$$

or as, $$F_1(k) = F(k) \exp(-ikx_o) \quad (3).$$

Thus, the form of the Fourier transform differs only by the phase factor $\exp(-ikx_o)$, remembering that the amplitudes $|F_1(k)|$ and $|F(k)|$ and the intensity, the amplitudes squared, are equal. In many wave problems the function $f(x)$ is complex, i.e., $f(x) = \text{Re}[f(x)] + i\text{Im}[f(x)]$, and an analysis of transforms of complex functions applies. A plane wave has a wavefront in a plane of constant phase normal to the direction of propagation. Often a plane wave may be written as $$E = E_o \exp(-i\omega t) \quad (4)$$

In Equation 4, the wave is represented as E, as a function of time, where the frequency characteristics are captured in the exponential term. In Equation 4, the amplitude is at a maximum at $t=0$.

Unfortunately, if phase information for the two pulses is not known ahead of time, then there is no unique combination of frequencies and amplitudes that may be combined to produce an identical plot of intensity versus time. Essentially, there is not enough information in the intensity versus time plot alone to be able to reconstruct the phase of the original pulses. The method to solve for the phase in these types of problems is referred to as phase retrieval. In essence, the phase retrieval problem is similar to solving a single equation for two unknowns—many solutions exist. To overcome this problem, a constraint must be imposed, i.e., an additional equation. Additionally, the constraint must be physically reasonable. Most phase retrieval problems are solved through imposition of a reasonable constraint that leads to a unique solution. The type of constraint depends on the application. In crystallography, symmetry conditions are typically imposed. In most instances for crystallographic application, the symmetry condition is applied to what is known as the outer bounds of the region. Such constraints benefit from prior knowledge of the way atoms are arranged in a crystalline structure. For other applications, other constraints must be found in order to retrieve phase.

To begin solution of such problems, an initial estimate of the phase is necessary. However, the guess is not so critical and any reasonable starting point can be used to obtain a solution. Of course, knowing that many of the solution techniques use iterative processes, a more reasonable guess typically results in fewer iterations in arriving at a unique solution.

In the field of phase retrieval, there is a class of problems known as Reconstruction from Multiple Fourier Intensities (RMI). This problem involves the reconstruction of two functions from multiple Fourier intensities of the product of relative displacements of the two functions. The solution to this important problem has significant applications to any situation where the intensity of the Fourier transform of the product of two functions is recorded for multiple relative displacements of the functions including transmission microscopy (optical, electron, and x-ray) and ultrafast laser diagnostics. For example, in the field of ultrafast laser diagnostics, the solution to the RMI problem is known as a frequency-resolved optical gating (FROG) trace inversion, spectrogram inversion, or sonogram inversion and is used to find the intensity and phase of an ultrashort laser pulse. In the case of FROG, for example (see FIG. 1), a gate pulse which is one function is scanned, in time, across a pulse (the other function) to be measured. For each time delay, the spectrum of the pulse that results from a well-defined nonlinear interaction of these two pulses is recorded. (The nonlinear interaction produces the product of the gate and pulse.) The resulting spectrogram, or FROG trace, is a plot of intensity versus time and frequency of the pulse. Unfortunately, it is only possible to obtain intensity information of the spectrum. Consequently, the key parameters of the pulse, the intensity and phase, cannot be obtained directly from this plot. An iterative two-dimensional phase retrieval method must be used to find the phase in order to extract the functions, and hence, the pulse characteristics from its spectrogram. Methods currently exist, but they require a priori knowledge of the gate function or are slow and cumbersome, requiring large amounts of computational power to arrive at the result. There is a need for fast inversion methods for ultrashort pulse measurement devices, and the same method will be generally applicable to other fields.

Ultrafast laser systems have a large number of applications in biochemistry, chemistry, physics, and electrical engineering. These systems generate laser pulses with durations of 10 picoseconds or less and such systems are used to explore kinetics in proteins, examine carrier relaxation in semiconductors, or image through turbid media. They are also used as an ultrafast probe in electronic circuits. By using ultrafast diagnostic systems, highly advanced semiconductors, electronic circuitry, and even biomedical products can be developed and tested for commercial applications. Furthermore, new applications requiring shaped ultrashort pulses in both intensity and phase such as coherent control of chemical reactions are beginning to be developed. The continued development of these applications will require, fast, high quality, and easy-to-use ultrafast laser pulse diagnostics.

FROG is an ultrafast laser diagnostic that is used to measure the intensity and phase of an ultrashort laser pulse. In a simple form, it produces a spectrogram of the pulse that is a 3-D plot of intensity versus frequency and time delay, showing the spectral components of time slices of the pulse. While the spectrogram of the pulse serves as an intuitive display of the pulse, it is difficult to obtain quantitative information about the pulse from the spectrogram, and subtleties in the pulse structure may go unnoticed without knowledge of the actual pulse. To obtain the original pulse from its spectrogram, the phase of the spectrogram must be determined requiring a 2-D phase retrieval computation. This mathematical step—which converts the measured spectrogram into two-dimensional plots of pulse duration and chirp—is the slowest step in existing FROG instrumentation. While it is possible to characterize an individual femtosecond pulse, the data analysis step takes sixteen-orders of magnitude longer: about 1 minute on a 100 MHz Pentium-based computer. Simple adjustments become difficult. A simple error analysis may take hours. Clearly, more than just faster computers are needed to invert FROG traces in real time. An entirely new approach to method design is required.

The development of techniques for ultrashort pulse measurement, that is, the profiling of the electric field envelope and the instantaneous frequency, has proven to be difficult. Early methods yielded only the intensity autocorrelation of the pulse. Later developments, such as interferometric autocorrelation, achieved the indirect determination of various phase distortions common to ultrashort pulses, but complete intensity and phase information about the pulse remain difficult to obtain. Some work has been done to extract the time-dependent intensity I(t) and the phase $\phi(t)$ (or, essentially equivalent to the phase, the instantaneous frequency $\omega(t)$), from these traces using iterative methods. Fundamental inherent ambiguities, including the direction of time, however, remain. It is therefore not possible to determine, for example, the sign of the chirp, unless a second measurement is made after pulse propagation through a known dispersive medium. Other methods yield only I(t) or require a streak camera and hence lack sufficient temporal resolution. Still other methods have been developed to measure the phase $\omega(t)$ but do not yield the intensity. Indeed, simultaneous time and frequency information is required for retrieval of the full complex electric field.

Time-frequency measurements of ultrashort pulses were first completed by Treacy in 1971. The Treacy method disperses the input pulse in frequency, selects a portion of the frequency components to produce another pulse, then cross correlates the newly formed pulse with the original input pulse. By scanning the frequency filter over all of the frequencies contained in the original pulse, a 3-dimensional plot of intensity versus frequency and time is produced which is commonly referred to as a sonogram. This method was refined by Chilla and Martinez with the development of frequency domain phase measurement or FDPM. Since the arrival time (i.e., the peak) of each frequency filtered pulse is given by the derivative of the phase (in the frequency domain) with respect to frequency, integration of arrival time of each pulse with respect to frequency gives the phase of the pulse in the frequency domain. Coupling this result with the spectrum of the pulse gives the Fourier transform of the complex electric field. The principal difficulty with this method is that if the peak of the arrival time of each frequency selected pulse does not produce a function, as is the case with self-phase modulated pulses, the group delay is not well defined and characterization of the pulse is not possible.

Spectrograms are close relatives to sonograms. Rather than displaying the time arrival of frequency filtered pulses, a spectrogram displays the frequency content of time slices of a pulse. Using optical methods to obtain a spectrogram of the pulse to be measured is the basis of a relatively new technique for the complete characterization of ultrashort laser pulses called frequency-resolved optical gating (FROG). FROG is a versatile technique that can be used in either multi-shot or single shot geometries. A gate pulse, which can be virtually any duration, slices out portions of a probe pulse in the time domain using either an instantaneously responding nonlinear material or a nearly instantaneously responding medium. The sampled portion of the probe, or signal, is dispersed in a spectrometer. Like a sonogram, the resulting spectrogram contains all the intensity and phase information about the probe pulse.

Obtaining the spectrogram of a pulse is experimentally less complex than obtaining the sonogram; however, extracting the intensity and phase of a pulse from its spectrogram is mathematically more challenging. If an approach similar to that of Chilla and Martinez is used to invert a spectrogram, the phase in the time domain is obtained, but the complete complex electric field is not. Since only the magnitude of the spectrogram can be measured, finding the full intensity and phase of the input pulse requires determining the spectrogram's phase, placing the FROG inversion problem into the category of 2-dimensional phase retrieval problems.

Frequency-resolved optical gating (FROG) is a technique used to measure the intensity and phase of an ultrashort laser pulse without ambiguity; it is broadband and does not require phase matching. Whereas Chilla and Martinez measured the cross correlation of a particular frequency component of an ultrashort pulse, FROG involves measuring the spectrum of a particular temporal component of the pulse (see FIG. 1). FROG does this by spectrally resolving the signal pulse in virtually any autocorrelation-type experiment performed in an instantaneously responding nonlinear medium.

As shown in FIG. 1, FROG involves splitting a pulse and overlapping the two resulting pulses in an instantaneously responding $X^{(3)}$ (or $X^{(2)}$ may be used as well, however, in this case, information about the direction of time is lost). Consequently, when the spectrogram is inverted and the pulse characteristics extracted, there is an ambiguity in direction of time. Even though any instantaneous nonlinear interaction may be used to implement FROG, perhaps the most intuitive is the polarization-gating configuration. In this case, the induced birefringence due to the electronic Kerr effect is used as the nonlinear-optical process. In other words, the "gate" pulse causes the $X^{(3)}$ medium, which is placed between two crossed polarizers, to become slightly birefringent. The polarization of the "gated" pulse (which is cleaned up by the first polarizer) is rotated slightly by the induced birefringence allowing some of the "gated" pulse to leak through the second polarizer. This is referred to as the signal. Because most of the signal emanates from the region of temporal overlap between the two pulses, the signal pulse indicates the frequencies of the gated pulse within this overlap region (See FIG. 1 inset). The signal is then spectrally resolved, and the signal intensity is measured as a function of wavelength and delay time τ. The resulting trace of intensity versus delay and frequency is a spectrogram, a time- and frequency-resolved transform that intuitively displays time-dependent spectral information of a waveform.

The spectrogram can be expressed as:

$$S_E(\omega, \tau) = \left| \int_{-\infty}^{\infty} E(t) g(t-\tau) \exp(-i\omega t) dt \right|^2 \quad (5)$$

where E(t) is the measured pulse's electric field, g(t−τ) is the variable-delay gate pulse, and the subscript E on $S_E$ indicates the spectrogram's dependence on E(t). The gate pulse g(t) is usually somewhat shorter in length than the pulse to be measured, but not infinitely short. This is an important point: an infinitely short gate pulse yields only the intensity I(t) and conversely, a continuous wave ("CW") gate yields only the spectrum I(ω). On the other hand, a finite-length gate pulse yields the spectrum of all of the finite pulse segments with duration equal to that of the gate. While the phase information remains lacking in each of these short-time spectra, this loss is compensated by having the spectrum of an infinitely large set of pulse segments. The spectrogram has been shown to nearly uniquely determine both the intensity I(t) and phase φ(t) of the pulse, even if the gate pulse is longer than the pulse to be measured (although if the gate is too long, sensitivity to noise and other practical problems arise).

In FROG, when using optically induced birefringence as the nonlinear effect, the signal pulse is given by:

$$E_{sig}(t, \tau) \, E(t)|E(t-\tau)|^2 \quad (6)$$

so the measured signal intensity $I_{FROG}(\omega, \tau)$, after the spectrometer is:

$$I_{FROG}(\omega, \tau) = \left| \int_{-\infty}^{\infty} E(t)|E(t-\tau)|^2 \exp(-i\omega t) dt \right|^2 \quad (7)$$

We see that the FROG trace is thus a spectrogram of the pulse E(t) although the gate pulse $|E(t)|^2$ is a function of the pulse itself. For Second Harmonic Generation ("SHG") FROG, E(t), the pulse itself, rather than $|E(t)|^2$, is the gate function.

To see that the FROG trace essentially uniquely determines E(t) for an arbitrary pulse, it is first necessary to observe that E(t) is easily obtained from $E_{sig}(t, \tau)$. Then it is simply necessary to write equation (7) in terms of $E_{sig}(t, \Omega)$, the Fourier transform of the signal field $E_{sig}(t, \tau)$ with respect to delay variable τ. We then have what appears to be a more complex expression, but one that will give us better insight into the problem:

$$I_{FROG}(\omega, \tau) = \left| \int_{-\infty}^{\infty} E_{sig}(t, \Omega) \exp(-i\omega t - i\Omega \tau) dt d\Omega \right|^2 \quad (8)$$

Equation (8) indicates that the problem of inverting the FROG trace $I_{FROG}(\omega, \tau)$ to find the desired quantity $E_{sig}(t, \Omega)$ is that of inverting the squared magnitude of the two-dimensional (2-D) Fourier transform of $E_{sig}(t, \Omega)$. This problem, which is called the 2-D phase-retrieval problem, is well known in many fields, especially in astronomy, where the squared magnitude of the Fourier transform of a 2-D image is often measured. At first glance, this problem appears unsolvable; after all, much information is lost when the magnitude is taken. Worse, it is well known that the 1-D phase retrieval problem is unsolvable (for example, infinitely many pulse fields give rise to the same spectrum). Intuition fails badly in this case, however; two- and higher dimensional phase retrieval essentially always yields unique results. At this point, it should be noted that FROG data are usually collected using a CCD so that the integrals shown in Eqs. 6, 7 and 8 are easily replaced by sums.

Since the FROG trace inversion problem is a 2-D phase retrieval problem, an iterative method is required to find the phase. Ideally, each iteration results in a slightly better "guess" for the solution of the phase until convergence. How a method determines each subsequent guess is paramount to it performance. The first FROG inversion method used integration of $E(t) |E(t-\tau)|^2$ with respect to τ to obtain subsequent guesses for E(t). While fast, this method stagnates easily and fails to invert spectrograms of double pulses.

To overcome stagnation problems in the FROG inversion DeLong et al. developed an improved composite method that employs modifying constraints in the basic method and a multivariate minimization of the FROG trace error with respect to E(t):

$$\varepsilon_{FT} \equiv \left[ \frac{1}{N^2} \sum_{i=1}^{N} \sum_{j=1}^{N} [I_{FT}(\omega_i, \tau_j) - I_{MEASURED}(\omega_i, \tau_j)]^2 \right]^{\frac{1}{2}} \quad (9)$$

where $\varepsilon_{FT}$ is the per element RMS error of the FROG trace, $I_{FT}(\omega_i, \tau_j)$ is the current iteration of the FROG trace (constructed from the current E(t)), $I_{MEASURED}(\omega_i, \tau_j)$ is the measured FROG trace, and $\omega_i$ and $\tau_j$ are the $i^{th}$ frequency and jt delay in the frequency and delay vectors, respectively. Three separate minimization methods are used to help prevent stagnation of the compound method. Unfortunately, multivariate minimization methods are very slow, sometimes requiring almost an hour to converge.

The method of generalized projections provided a much-needed boost to the speed of the compound FROG inversion method, obviating the need for multvariate minimization. Generalized projections is a powerful technique that works to solve systems where the solution lies at the intersection of two a more sets. In the case of FROG, set one is the set of all complex spectrograms with the same magnitude as the spectrogram to be inverted. The other set, set two, is the set of all pulses that fits the physics of the construction of the optical spectrogram. The fastest FROG inversion methods iterate between members of these two sets, but in the case of GP, a member of one set is chosen that minimizes the distance between it and the member of the other set. This is accomplished by producing a new guess for E(t) that minimizes the error function:

$$Z = \sum_{t,\tau=1}^{N} |E'_{sig}(t, \tau) - E_i(t)|E_i(t-\tau)|^2|^2 \quad (10)$$

with respect to $E_i(t)$ where i is the iteration number.

The complete GP method present by DeLong et al. works as follows: An initial guess of random noise modulated by a Gaussian is used for E(t) to generate a spectrogram, $E_{sig}(\omega, \tau)$. During each iteration of the method, the magnitude of $E_{sig}(\omega, \tau)$ is replaced by the square root of the experimentally measured FROG trace. To find the next guess for E(t) an inverse Fourier transform is performed to obtain $E'_{sig}(t, \tau)$. The next guess for E(t) is determined by the GP step described above. The method is repeated until the error reaches an acceptable minimum.

The GP method presented by DeLong et al. is robust, inverting almost any spectrogram while being faster than brute force minimization. However, for simple pulses, it is slower than the basic FROG method because it still contains a minimization step (albeit along the gradient of Z). Consequently, the complete FROG inversion method presented by DeLong et al. is a composite method that still uses all the basic FROG method because the basic method is faster than the GP method for some pulses.

References that appear to disclose phase retrieval techniques are as follows: Method and Apparatus for Measuring the Intensity and Phase of an Ultrashort Light Pulse, U.S. Pat. No. 5,754,292, Kane et al. (May 19, 1998). This patent discloses an iterative process for determining time-dependent intensity and phase of a spectrogram obtained from frequency-resolved optical grating (FROG) of an ultrashort light pulse. The FROG technique yields an "experimental" intensity signal dependent on frequency and the delay time between a gate pulse and a probe pulse. Phase information is obtained from the two-dimensional intensity data through a phase-retrieval method. The patent discloses a preferred iterative one dimensional Fourier transform method. The preferred method performs a Fourier transform from time domain to frequency domain and an inverse Fourier transform from frequency domain to time domain. The method also requires an initial guess for the time dependent electrical field. According to the disclosure, an electrical field based on noise suffices for the initial guess (although an alternative method for deriving an initial guess is discussed). This guess is then used to create a time and delay time dependent electrical field. A one-dimensional Fourier transform of this field yields a frequency and delay time dependent electrical field. The magnitude of this field is replaced with the square root of the "experimental" frequency and time delay dependent intensity signal. An inverse Fourier transform is performed to yield a time and delay time dependant electrical field. This field is integrated with respect to delay time to update the initial guess. The iterative process continues until convergence. The disclosure does not state the convergence criteria.

Method and Apparatus for Measuring the Intensity and Phase of One or More Ultrashort Light Pulses and for Measuring Optical Properties of Materials, U.S. Pat. No. 5,530,544, Trebino et al. (Jun. 25, 1996). In a first embodiment, for a single pulse, this patent discloses a phase-retrieval solution method similar to that of the '292 Kane et al. patent. However, an initial guess using a Guassian-intensity flat-phase pulse is said to provide better convergence. The disclosure states that the difference between the experimental FROG trace and the FROG trace generated by the calculated electric field serves as a meaningful measure of error for purpose of a convergence criterion. This is quantified in the method as a RMS error value. In a second embodiment, for multiple pulses, this patent states that phase-retrieval has proven to be "extremely difficult" for the basic FROG method. To overcome basic FROG limitations, the method adds an intensity constraint, an overcorrection method, and a multidimensional minimization technique. In a third embodiment, this patent discloses a method for phase-retrieval based on the theory of Generalized Projections (GP). The GP method relies on satisfying two distinct mathematical constraints. The correct signal field lies at the intersection of the two constraint sets. The intersection of the two constraint sets is found by iteratively projecting, or mapping, points onto the two constraint sets. This embodiment uses an iterative error minimization technique based on a distance function to approximately find where the points converge near the intersection of the two sets. In a fourth embodiment, the patent discloses a technique that compensates for non-instantaneous components of the response. Non-instantaneous components result from Raman absorbance and emission and may impart cubic phase distortions in the retrieved pulse frequency domain. The compensatory technique accounts for the non-instantaneous response of the medium. The added degree of accuracy increases the number of calculations required for solution. Where $N^2$ is the number of pixels in a FROG trace, the number of calculations required by the fourth embodiment scale by $N^3$ in comparison to $N^2$ for the nearly instantaneous case. A fifth embodiment deviates from the prior embodiments in that it may resolve intensity and phase of more than one pulse on a multiple or single-shot basis. The fifth embodiment requires modification of the basic apparatus to accommodate non-identical gate and probe pulses. Retrieval of intensity and phase of both pulses is referred to as Twin Recovery of Electric field Envelopes using FROG, or TREEFROG. The TREEFROG problem is similar to blind deconvolution, i.e., to retrieve both the original image and distortion function from a blurred image. The process resolves the probe and gate pulses as a function of time given the 2-dimensional TREEFROG intensity plot. The TREEFROG method begins with guess for both probe and gate pulses to generate an electric field from a Fourier transform of P(t)G(t−τ). The magnitude squared of the electric field forms a trial TREE-FROG trace. This trial trace is compared with the experimental trace to determine convergence. The magnitude of the trial is constrained to the intensity of the experimental trace while leaving the phase unchanged thus giving a modified electric field. An inverse Fourier transform of the modified signal yields a modified electric field with respect to time and delay time (a typographical error appears in the patent). The method of generalized projections is used to generate alternate updates of probe and gate pulses as a function of time by minimizing an error function with respect to the pulse of interest. A spectral constraint is added to increase the robustness of the method of the fifth embodiment. The spectral constraint requires measurement of field spectra. The sixth embodiment of the invention discloses a method using two FROG apparatuses or a TREEFROG apparatus to measure optical properties of a medium. The analysis uses a method similar to the GP TREEFROG of the fifth embodiment. In a seventh embodiment, the method disclosed in the seventh embodiment is analogous to optical heterodyne detection methods. This embodiment obviates the need for phase retrieval since the method measures the complex field and solves for both imaginary and real parts of the field. The complex field can then be used to calculate intensity and phase. An interferometric second-harmonic generation (ISHG) variation is also disclosed—both techniques use local oscillator-like pulse mixing and require minimization methods. The ISHG solution is identical to the normal FROG phase retrieval problem. The eighth embodiment involves measuring the spectrum of the coherent sum of known and unknown pulses. The method is known as Temporal Analysis of a Dispersed Pair Light E-fields (TADPOLE). Solution of two simultaneous equations with two unknowns yields phase information. A ninth embodiment discloses a solution technique based on artificial neural nets (ANN) for retrieval of pulse information from an experimental FROG trace. Training the ANN is the time consuming step. Theoretically, a trained ANN may provide pulse information on a nearly real-time basis. A variety of training enhancements is also disclosed together with disadvantages of the ANN approach.

Apparatus for Characterizing Short Optical Pulses, U.S. Pat. No. 5,684,586, Fortenberry et al. (Nov. 4, 1997). This patent discloses an analyzer for analyzing intensity and phase characteristics of an optically dispersed short input pulse. The intensity and phase characteristics of the short input pulse are determined by applying a back-propagation method to the dispersed pulse. In a preferred embodiment, the dispersed pulse is split to create an optical interference spectrogram. Analysis of the split dispersed pulse optical interference spectrogram yields intensity and phase of the dispersed pulse. The back-propagation technique relies on knowledge of the transfer function of the optical disperser. The specification states that known methods of analyzing spectrograms, such as those created by the split dispersed pulse, include the FROG technique by Kane et al. and optical heterodyne detection techniques.

Method and Apparatus for Measuring Ultrashort Optical Pulses, U.S. Pat. No. 4,792,230, Naganuma et al. (Dec. 20, 1988). In one embodiment, the method and apparatus of Naganuma et al. measures intensity shape and pulse shape of ultrashort optical pulses that repeat with a constant period. These pulses are subject to a beam splitter, two different path lengths, recombination and focusing onto a doubling crystal. The doubling crystal generates second harmonic light, i.e., light with a wavelength one half that of the incident light, that is converted to a voltage by an optical detector. Three spectra are recorded and analyzed through Fourier transform techniques. Phase reconstruction proceeds through an iterative calculation. In a second embodiment, ultrashort optical pulses repeating with a constant period are subject to a similar analysis, however, the signal recorded by the optical detector is divided into two portions. Two components are extracted from the signal, a low frequency DC component and a high frequency component near the frequency of the interference fringe near the fundamental wave—obtained through use of an AC voltmeter. The DC and AC measurements occur simultaneously while constantly varying the difference between the pulse path lengths. Fourier analysis of the data yields the intensity shape of the measured pulse while iterative calculations yield the phase shape. In a third embodiment, a detector is used that produces an electrical signal proportional to the fundamental light and the second-harmonic light. This signal is collected while constantly varying the pulse path lengths. A Fourier analysis of the intensity change data of the first harmonic and second harmonic light together with the intensity of the measured optical pulse yields intensity shape and phase shape through an iterative process. In essence, the patent discloses use of a Michelson interferometer and a doubling crystal to produce signals amenable to various autocorrelation techniques for second-harmonic electric fields.

Spatial Wavefront Evaluation by Intensity Relationships, U.S. Pat. No. 5,367,375, Siebert (Nov. 22, 1994). This patent discloses a method for determining the phase profile of a wavefront at a first plane using additional information about the wavefront at a second plane. The method entails determining impinging a wave on a first plane, measuring the intensity of the wavefront at a second plane, and determining the phase difference of the wavefront at the first plane in accordance with a transfer function that employs data gathered at the two planes. Three noniterative approaches are given to solve an optical transfer function equation for aperture phase and pupil wavefront: polynomial approach, sampling approach, and general approach.

Signal Processing Apparatus and Method for Iteratively Determining Arithmetic Fourier Transform, U.S. Pat. No. 5,253,192, Tufts (Oct. 12, 1993). This patent discloses a method and apparatus for iteratively determining the inverse Arithmetic Fourier Transform (AFT). In general, analog to digital conversion of input data limits the standard forward AFT as opposed to accumulation of rounding and coefficient errors that limit Fast Fourier Transform techniques. In addition, the AFT does not require storage of memory addressing. The AFT method is also closely related to the least squares successive approximation realization of the Discrete Fourier Transform (DFT). In one embodiment, an input signal is received and a data signal vector generated. A frequency domain signal vector is generated by multiplying the data signal vector by a predetermined transform signal matrix and a predetermined number of iterations. An inverse transformation on the frequency domain signal vector is performed by multiplying the frequency domain signal vector by an AFT signal matrix; this step produces a synthesized data signal vector. The next step generates and error signal vector that is converted into a frequency domain improvement signal by multiplying the error signal vector by the transpose of the AFT signal matrix and a predetermined scaling signal value. Finally, an updated frequency domain signal vector is generated and the iterative cycle continues until the error reaches a specified minimum. In another embodiment, an input signal is received and a data signal vector generated. A frequency domain signal vector is generated by multiplying the data signal vector by a predetermined transform signal vector rather than a predetermined transform signal matrix.

SUMMARY OF THE INVENTION
(DISCLOSURE OF THE INVENTION)

The present invention comprises an apparatus and a method for measuring and determining characteristics of wave phenomena. The apparatus comprises means for generating wave phenomena interaction from light or other wave sources. The interaction data is derived from single or multiple waves. For the single wave case, the wave typically interacts with a medium. When a wave interacts with a medium, energy is transmitted, reflected, and/or absorbed. In some instances, the medium reflects a wave that can combine with the incident wave. The combination of these two waves can produce interference and/or interaction phenomena. Alternatively, phenomena such as second harmonic generation can result.

The apparatus of the present invention also has means for measuring wave phenomena interaction. Such mechanisms are known in the art and depend on the energy and wavelength of the wave or waves. Most importantly, the apparatus of the present invention has means for determining information on wave characteristics. The apparatus has the capability to perform mathematical operations. More specifically, the apparatus has the capability to represent wave phenomena data in the form of eigenvectors. The eigenvector representations of the data typically relate to intensity and phase characteristics of a measured wave or waves. In some instances, the eigenvectors are present within the apparatus as principal component eigenvectors. In most embodiments of the present invention, eigenvectors representing intensity and phase characteristics of the measured wave or waves are manipulated by a method with the apparatus for performing singular value decomposition.

Additionally, in most embodiments of the present invention, eigenvectors representing intensity and phase characteristics of the measured wave or waves are manipulated by a method within the apparatus for performing power methods. The apparatus of the present invention, however, is not limited to singular value decomposition or power methods for manipulating eigenvectors. For instance, a neural network can also manipulate the eigenvectors to provide eigenvectors that represent intensity and phase of the measure wave or waves. In some applications, the measured wave or waves phenomena interaction data is represented as an eigentensor or eigentensors. The apparatus also can use constraints for determining intensity and phase of wave phenomena interaction data. For example, the method within the apparatus may use spectral constraints, intensity constrains, phase constraints, and other constraining information that aides eigenvector formation and manipulation.

The method of the present invention determines characteristics of wave phenomena. The method starts with wave phenomena interaction data and then determines characteristics of the data using eigenvectors. In several embodiments of the present invention, the method determines principal component eigenvectors. In all embodiments, eigenvectors are manipulated by methods. Some methods use singular value decomposition while others use power methods. Combinations of both are also within the scope of the present invention as are other methods that use neural networks and the like. Constraints are used within the methods to manipulate the eigenvectors. For example, the method of the present invention may use methods with spectral constraints, intensity constraints, phase constraints, and other constraining information that aids eigenvector formation and manipulation. Depending on the nature of the wave data, the method may also use eigentensors. The method of the present invention may also provide wave phenomena data having gate and probe pulses. In a preferred embodiment, wave phenomena data having time delay between gate and probe pulses.

Given wave phenomena interaction data from a manufacturing process, the method of the present invention can determine manufacturing process parameters from the data. This is, in some cases, facilitated through the use of a neural network, expert system, learning system or the like. This embodiment of the method can determine process parameters like temperature, composition, water content, and concentration. In another embodiment, the method of the present invention can generate a phase mask from a lithograph. In this embodiment, the method of the present invention determines phase characteristics of a source and a mask for making the lithograph using eigenvectors.

In a preferred embodiment, the method of the present invention determines characteristics of wave phenomena interaction data by generating a frequency-resolved optical gating trace from the wave data and determining characteristics of the data using eigenvectors. Again, such characteristics include intensity and phase.

A primary object of the present invention is to determine wave charatceristics from wave phenomena interaction data.

An additional object of the present invention is to determine wave characteristics where a wave can be represented as a complex or real function of one or more variables. Wave phenomena data result from multiple interactions of relative displacements of more than one wave. An interaction occurs when an invertible transformation acts on the product of two or more waves.

A primary advantage of the present invention is that the number of computational steps to yield wave characteristics is reduced when compared to past apparatuses and past methods.

When applied to ultrashort laser pulses, the results presented imply that the method of Principal Component Generalized Projections (PCGP) is a useful improvement over past methods. The present invention offers two important advantages: inversion speed and compact code that can run efficiently on a DSP.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 3a–3d show a FROG trace for a double pulse with zero phase deviation. FIG. 3b shows a probe that is retrieved from the FROG trace shown in FIG. 3a using the algorithm depicted in FIG. 2 (x's). The solid line is the original probe. FIG. 3c shows the same as FIG. 3b with the exception of the gate. FIG. 3d shows the recovered phase for the probe (x's). The solid line is the original phase.

FIGS. 7 show the front panel of a computer program to implement the inversion algorithm. FIG. 7c shows the sale for FIG. 7a.

DESCRIPTION OF THE PREFERRED EMBODIMENTS

Figure 1:
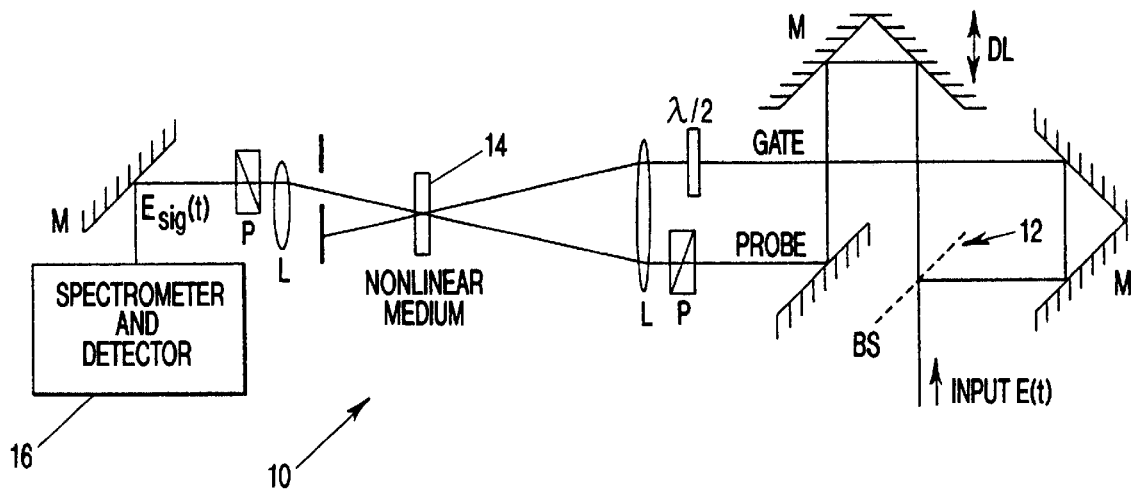
FIG. 1 shows a schematic of a frequency-resolved optical gating device 10. The diagram above the schematic shows what actually happens in the nonlinear medium 14. Signal occurs only when the probe and the gate overlaps in time.

The present invention embodies a Principal Component Generalized Projection Method or PCGPM. This method reduces n-dimensional FROG phase retrieval problems to eigenvector problems, but is still as robust as Generalized Projections (GP) methods presently used. The PCGP method is so compact that it can be readily implemented on currently available and inexpensive Digital Signal Processors (DSP). Furthermore, the compact nature of the method code allows hand optimization, further increasing its speed. IBM PC-compatible boards with speeds of 60 million floating point operations per second (MFLOPS) suitable for implementing the PCGP method can be purchased for under $600. This will allow the development of an ultrafast laser pulse oscilloscope based on virtually any optical method that produces a spectrogram or sonogram. With currently available technology, this instrument would be able to display the intensity and phase of an ultrafast laser pulse in real time with update rates of better than 3 Hz. In the near future, with the availability of faster DSP's, this update rate will easily double or triple.

More specifically, this invention entails a fast solution to the general RMI problem that can be applied to ultrafast diagnostics. This method is general and can be applied to a variety of manifestations of FROG including multishot and single-shot devices using virtually any instantaneous nonlinear interaction as well as other ultrafast laser pulse measurement devices (i.e., the Chilla and Martinez method, or FDPM).

To make the FROG inversion method fast and robust, a GP method must be used (so the method is robust) and the minimization step must be removed (so the method is fast). This is exactly what the method of the present invention achieves. This is accomplished by converting the FROG inversion problem into an eigenvector problem. Consequently, the problem of finding each subsequent guess for E(t) reduces to a few fast matrix-vector multiplies.

In gate and probe problems, if the gate function is known, but the pulse to be measured is not known, it is possible to fully determine the pulse to be measured. However, this is not an interesting real-world problem and is not the main focus of the present invention. The present invention is more specifically interested in the following problems: 1) when the gate function and the pulse to be measured are unknown, and 2) when the gate pulse is a function of the pulse to be measured (or vice versa). Of course, the present invention is not limited to these two problems.

Before discussing the present invention's inversion method in detail, it is instructive to discuss the construction of FROG traces using discrete vector pairs. This will define nomenclature that simplifies discussion of the method. Two vectors of length N are used to represent the probe and the gate fields:

$$E_{Probe} = [E_1, E_2, E_3, E_4, \ldots, E_N] \tag{11}$$

$$E_{Gate} = [G_1, G_2, G_3, G_4, \ldots, G_N] \tag{12}$$

The outer product of $E_{Prode}$ and $E_{Gate}$ is:

$$\begin{bmatrix} E_1G_1 & E_1G_2 & E_1G_3 & E_1G_4 & \ldots & E_1G_N \\ E_2G_1 & E_2G_2 & E_2G_3 & E_2G_4 & \ldots & E_2G_N \\ E_3G_1 & E_3G_2 & E_3G_3 & E_3G_4 & \ldots & E_3G_N \\ E_4G_1 & E_4G_2 & E_4G_3 & E_4G_4 & \ldots & E_4G_N \\ \vdots & \vdots & \vdots & \vdots & \ldots & \vdots \\ E_NG_1 & E_NG_2 & E_NG_3 & E_NG_4 & \ldots & E_NG_N \end{bmatrix} \tag{13}$$

This is referred to as the outer product form.

The rows of the outer product form are manipulated to generate an equivalent matrix that gives a time domain representation of FROG trace. By leaving the first row unshifted and by shifting subsequent rows to the left, the following matrix results:

$$\begin{bmatrix} E_1G_1 & E_1G_2 & E_1G_3 & \ldots & E_1G_{N-2} & E_1G_{N-1} & E_1G_N \\ E_2G_2 & E_2G_3 & E_2G_4 & \ldots & E_2G_{N-1} & E_2G_N & E_2G_1 \\ E_3G_3 & E_3G_4 & E_3G_5 & \ldots & E_3G_N & E_3G_1 & E_3G_2 \\ E_4G_4 & E_4G_5 & E_4G_6 & \ldots & E_4G_1 & E_4G_2 & E_4G_3 \\ \vdots & \vdots & \vdots & \ldots & \vdots & \vdots & \vdots \\ E_NG_N & E_NG_1 & E_NG_2 & \ldots & E_NG_{N-3} & E_NG_{N-2} & E_NG_{N-1} \end{bmatrix} \tag{14}$$

$\tau = 0 \quad \tau = -1 \quad \tau = -2 \quad \ldots \quad \tau = +3 \quad \tau = +2 \quad \tau = +1$ The $\tau=0$ column is the first column, where $\tau$ is the time delay in resolution element number (column number). This is just the probe multplied by the gate with no time shift between them. The next column is the $\tau=-1$ column where the gate is delayed relative to the probe by one resolution element. After some column manipulation the most negative $\tau$ is on the left and the most positive on the right; this time domain FROG trace is the discrete version of the product $E_{Probe}(t) E_{Gate}(t-\tau)$. The columns are constant in $\tau$ (delay time) while the rows are constant in t (time). To obtain the FROG trace, the Fourier transform of the product $E_{Probe}(t)E_{Gate}(t-\tau)$ with respect to t is obtained. Each column of the matrix shown in Equation 14 is Fourier transformed using a Fast Fourier Transform method (FFT) or other suitable method. The final step of squaring the magnitude of the complex result produces the FROG trace.

The present invention is not limited to a Fourier transform of the columns. Any invertible transformation may be used. It is also not limited to the squaring of the magnitude of the complex result, or the magnitude of the complex result.

Figure 2:
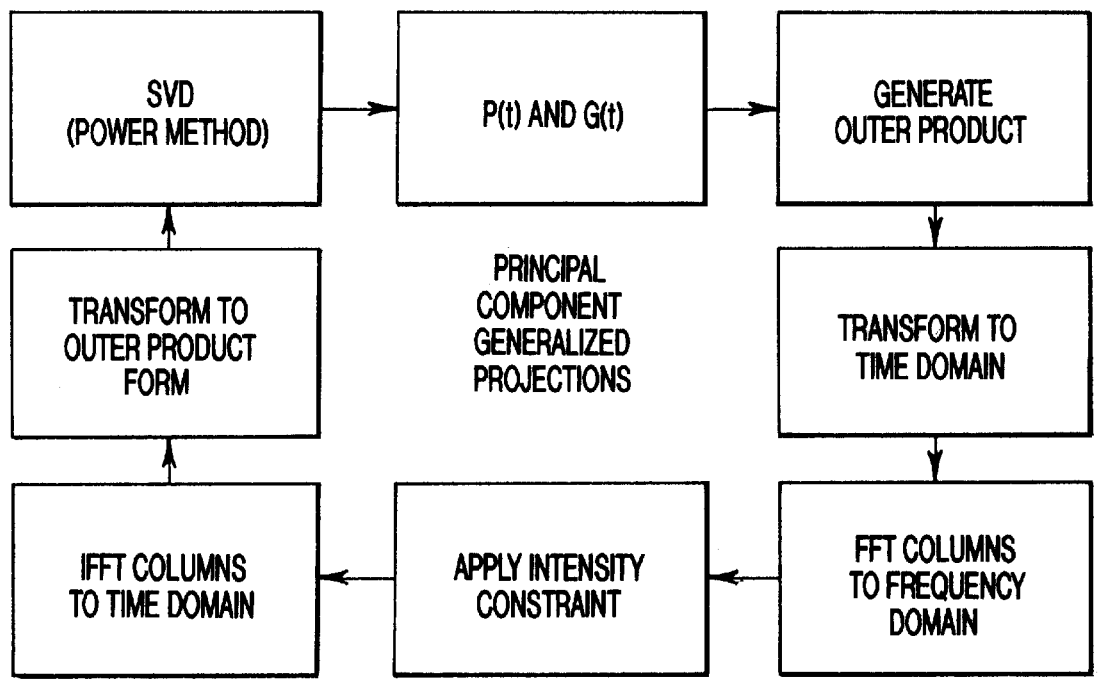
FIG. 2 shows a schematic of the PCGP method of the invention. The figure shows a singular value decomposition being used to obtain the next guess for the pulse and gate. The preferred embodiment of the present invention uses the power method which reduces the construction of the next guess to matrix-vector multiplies.

While there are an infinite number of complex images that have the same magnitude as the FROG trace to invert, there is only one image that is formed by the outer product of a single pair of vectors that has the same magnitude as the FROG trace to invert. Like other 2-D phase retrieval methods, to find the proper vector pair, an iterative method is used (FIG. 2). An initial guess for the phase of the FROG trace is made, and the result is decomposed into outer products. The principal pair of vectors is kept and used to determine the next guess of the FROG trace phase.

To construct the initial guess for the phase, a FROG trace is constructed by vector pairs, one complex (probe) and, in the case of polarization-gate FROG, one real (gate), that are random noise modulated by a broad Gaussian. The iterative method is started by replacing the magnitude of the newly constructed FROG trace by the square root of the magnitude of the experimental FROG trace.

The FROG trace with the correct magnitude is converted to the time-domain FROG trace using an inverse Fourier transform by column (see FIG. 2). Next, the time-domain FROG trace is converted to the outer product form, Equation 13. If the intensity and phase of the FROG trace are correct, this matrix is a matrix of Rank 1. That is, it has one and only one non-zero eigenvalue. The eigenvector corresponding to this eigenvalue spans the range of the outer product matrix and is called the right eigenvector; this vector is the probe. The complex conjugate of the eigenvector of the transpose of the outer product matrix (left eigenvector) is the gate.

Unfortunately, the outer product form matrix produced by the initial guess has typically several eigenvectors. In fact, an ill-conditioned matrix may result, however, the probability that it is singular is low. The range of this new matrix is no longer a single line in N space, but rather an ellipsoid in N space. The question arises: which eigenvector pair (right and left) represents the best next guess for the probe and the gate? From linear algebra, the eigenvectors span the range of the outer product form matrix, and they are linearly independent although not necessarily orthogonal. This means that the best next guess may actually be a superposition of two or more different, but linearly independent eigenvectors.

The problem of producing the next best guess is solved using an elegant numerical method in linear algebra called a singular value decomposition (SVD). SVD decomposes a matrix into a superposition of outer products of vectors. This can be written as:

$$O = U \times W \times V^T \quad (15)$$

where U and $V^T$ are orthogonal square matrices and W is a square diagonal matrix. Since both U and V are orthogonal, the column vectors of these matrices are all orthogonal and form an orthonormal basis set that describes the range of matrix O. Thus, the matrix O, the outer product form, is decomposed into a superposition of outer products between "probe" vectors (columns of U) and "gate" vectors (rows of $V^T$). The diagonal values in W (the only non-zero elements of W) determine the relative weights of each outer product and, therefore, how much each outer product contributes to matrix O. In one embodiment of the FROG retrieval method presented here, only the outer product pair with the largest weighting factor, or principal component, is kept for the next iteration of the method. In most instances, the remaining columns of U and V contain little information. However, the method may be modified to use this information to enhance aspects of convergence.

A new FROG trace is constructed from the probe vector and the magnitude of the gate vector (or a complex valued gate vector when appropriate) obtained from the SVD of the outer product form matrix. The process is repeated (see FIG. 2) until the FROG trace error, $\epsilon_{FT}$, reaches an acceptable minimum.

Figure 3B:
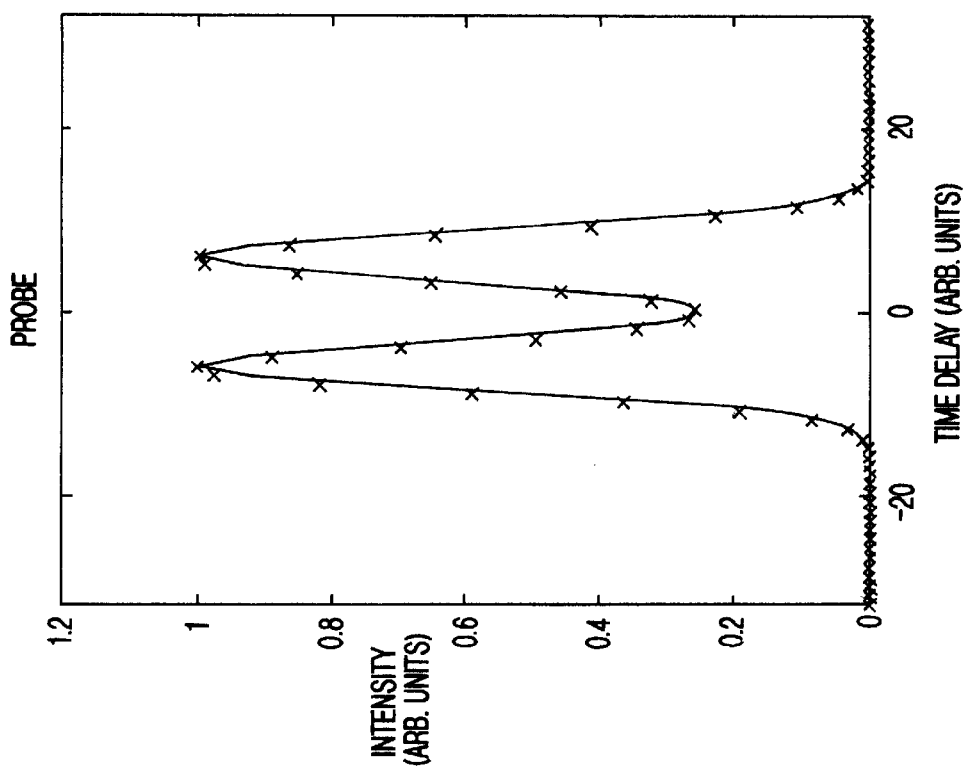
Figure 3A:
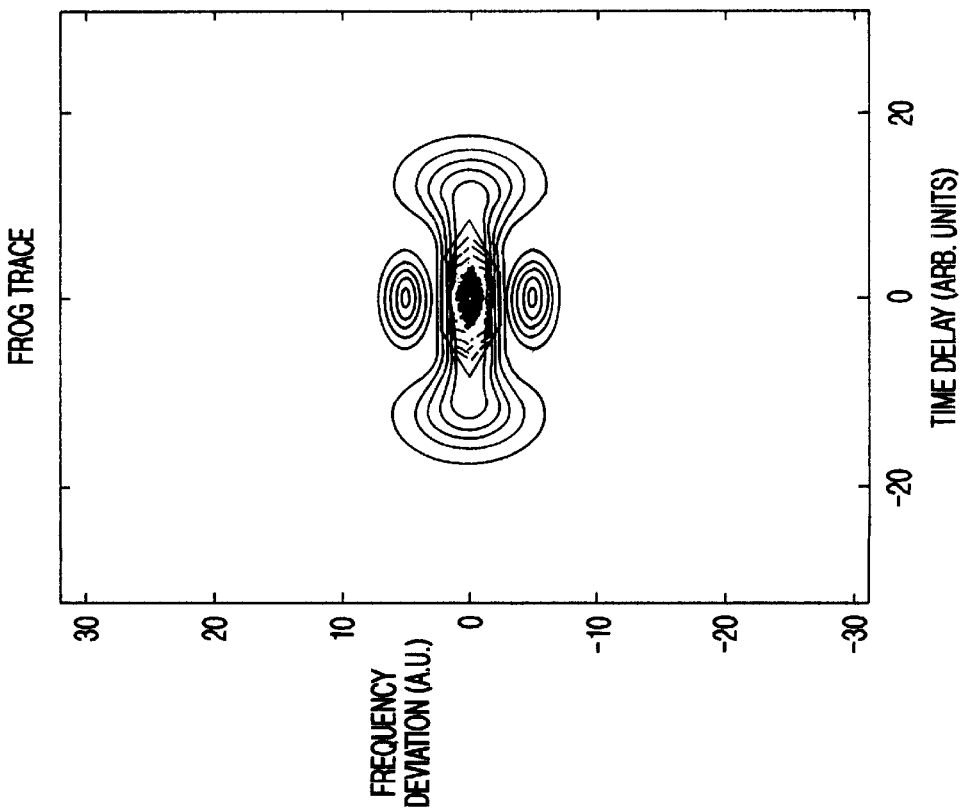

Using SVD has an additional advantage as well. SVD provides the best packing efficiency for a given image. In other words, the image produced from the product of the outer product of the vector pair with the largest weighting factor is the best rank 1 approximation of that image in the least squares sense. That is, it minimizes the error function:

$$\varepsilon^2 = \sum_{i,j=1}^{N} |E_{Outer}^{i,j} - E_{Probe}^{i} E_{Gate}^{j}|^2 \quad (16)$$

where $E_{Outer}$ is the outer product form of the FROG trace shown in Equation 13, $E_{Probe}$ is the probe vector, $E_{Gate}$ is the gate vector, and $\epsilon$ is the error. This shows that the probe and gate found using SVD in the method described above represents a projection found directly without minimization. Neither the set of functions with a given Fourier transform magnitude nor the set of all outer products is a convex set, however. Since one or more of the constraints applied is not a projection onto a convex set, this method is related to the technique known as generalized projections; hence, the present invention refers to this method as a principal component generalized projections method, or PCGPM. FIGS. 3 shows a synthetic test of this method.

The above implementation of the FROG inversion method using the singular value decomposition step may be comparatively slow and consume time by providing information with potentially limited use. The present invention also demonstrates a shortcut that significantly reduces computational time. Since only the principal eigenvector pair (one left and one right) is required, these eigenvectors can be obtained by using the power method. When a matrix, O, is decomposed using SVD, the eigenvectors of $OO^T$ (probe) and $O^TO$ (gate) are found along with the eigenvalues of $OO^T$ (which are the same as $O^TO$ and are called the weighting factors). The principal vector pair is the pair with the largest weighting value or the dominate eigenvalue of $OO^T$ (or $O^TO$).

Assume a matrix O with a dominant eigenvector and $x_o$ is an arbitrary vector. If the vector is multiplied by the matrix O raised to a large power, then the dominant eigenvector multiplied by a constant is the result. This works because the action of multiplying a vector by a matrix maps the vector onto a superposition of eigenvectors of the matrix. For example, suppose the vector $x_o$ is mapped onto a superposition of eigenvectors by matrix O. Then:

$$(O)^p x_o = k_1 \lambda_1^{p-1} v_1 + k_2 \lambda_2^{p-1} v_2 + \ldots + k_n \lambda_n^{p-1} v_n \quad (17)$$

where $v_1 \ldots v_n$ are the eigenvectors of matrix O and $k_1 \ldots k_n$ are constants. It follows that:

$$O_{xo} = k_1 v_1 + k_2 v_2 + \ldots + k_n v_n \quad (18)$$

where $\lambda_1 \ldots \lambda_n$ are the eigenvalues of matrix O. The first multiplication of $x_o$ by matrix O maps $x_o$ onto a superposition of eigenvectors multiplied by constants $k_1 \ldots k_n$. Each subsequent multiplication multiplies the igenvectors by their respective eigenvalue. If p is large enough, and if $v_1$ is the dominant eigenvector, then $\lambda_1^{p-1}, \lambda_2^{p-1} \ldots \lambda_n^{p-1}$. The result will appear to be the dominant, or principal, eigenvector multiplied by a constant.

Obviously, if it required a large number of matrix multiplications to find the eigenvector, then little would be gained by using this method over a singular value decomposition. However, the present invention demonstrates that the SVD step in the PCGP method may be replaced with the following:

$$PROBE_i = O(O)^T (PROBE_{i-1}) \quad (19)$$

$$GATE_i = (O)^T O(GATE_{i-1}) \quad (20)$$

where i is the iteration number and O is the outer product form of the time domain FROG trace as described above. Thus, $OO_T$ maps the previous guess for the probe onto the next guess for the probe and $O^T O$ maps the previous guess for the gate onto the next guess for the gate. By replacing the SVD step by these mapping functions, the speed per iteration of the method has increased by a factor of 50 while the number of iterations required for convergence has not increased. Further, the robust nature of the PCGP method is not compromised.

This foregoing embodiment is not limited to using the outer product form of the time domain FROG trace, O, raised to the first power. In fact, $O^n$ may be used where the power n takes on any value. The transpose of O likewise may be raised to a power where the power is the same or different than the power of O. Of course, the present embodiment also is not limited to simple combinations of O and $O^T$.

The foregoing embodiment is not limited to updated probe and gate vectors based solely on the previous probe and gate. For instance, gate and probe vectors from many past iterations may be used to enhance the method. Such techniques are common in control systems theory and practice and involve techniques that use, for example, shooting, forgetting factors and the like. In many instances, such techniques smooth the solution and limit oscillations while often enhancing convergence. Use of these techniques is not limited to this particular embodiment.

In another embodiment of the present invention, spectral constraints are applied to PCGPM. PCGPM is inherently a blind-FROG or TREEFROG method that finds the probe and gate independently without any assumptions about relationships between them. As a result, it may be prone to some ambiguities involving the width of the gate and probe pulses. For example, a very slight change in the width of the probe may be compensated for by the method by a slight change in the width of the gate without changing the RMS error significantly. In FROG as opposed to blind-FROG, because of the a priori knowledge of the relationship between the probe and gate, these width ambiguities are not a problem. These ambiguities are resolved when using a blind-FROG inversion method such as PCGPM by the addition of a spectral constraint on either the probe or the gate. In PCGPM, the spectral constraint is applied after the intensity constraint is applied and just before the next guess is computed when the FROG trace is in the outer product form. When in this form, each column is ideally a constant (one of the elements of the gate) multiplied by the probe field. Consequently, each column is Fourier transformed and the magnitude is replaced by the square root of the measured pulse spectrum. To insure the gate field is preserved, the area of the intensities before and after the spectral constraint is applied are kept equal. To prevent artifacts from appearing in the wings of the FROG trace, the spectral constraint may only be applied to portions of the trace that has an integral above some predetermined level.

Figure 4B:
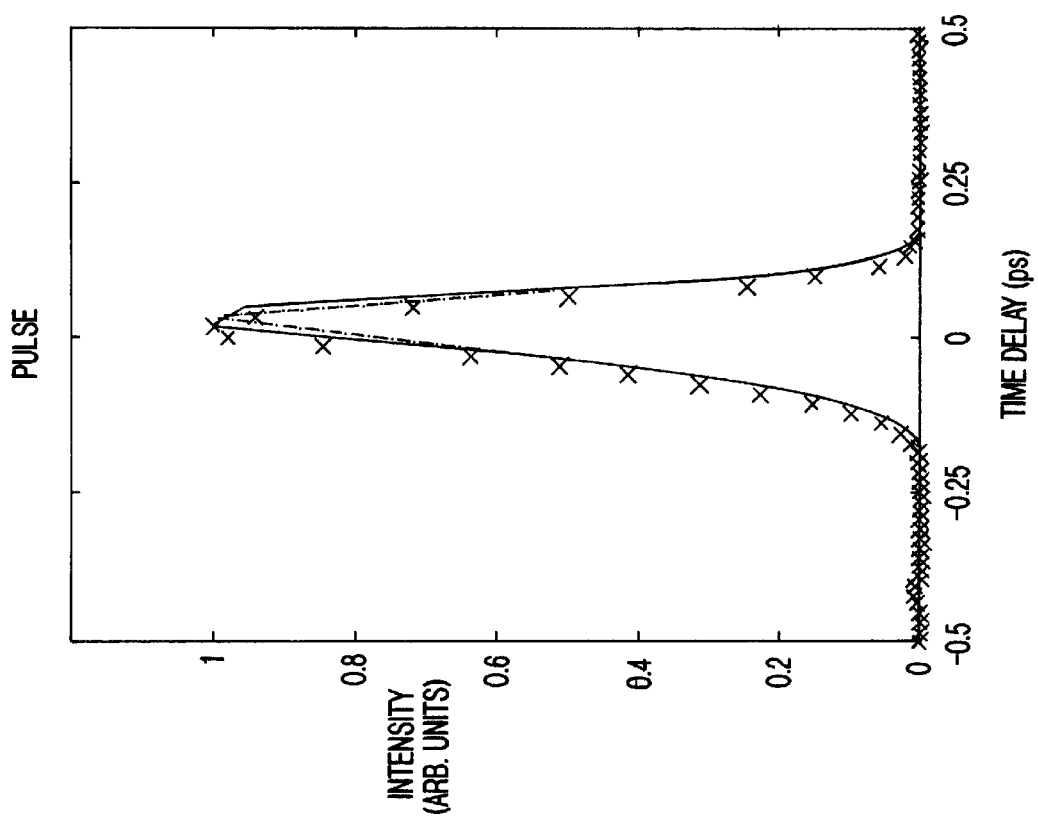
FIG. 4b shows the pulse retrieved from the FROG trace shown in FIG. 4a using the inversion algorithmn.
Figure 4A:
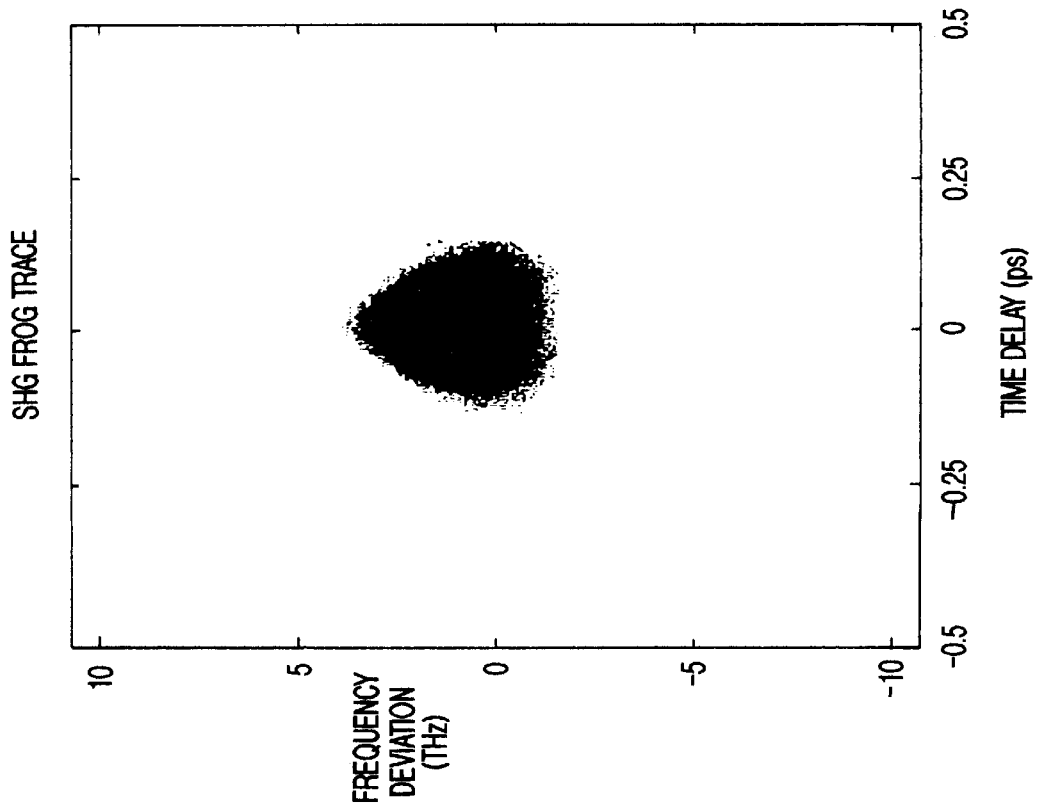
FIG. 4a shows an SHG FROG trace.
Figures 4C, 4D:
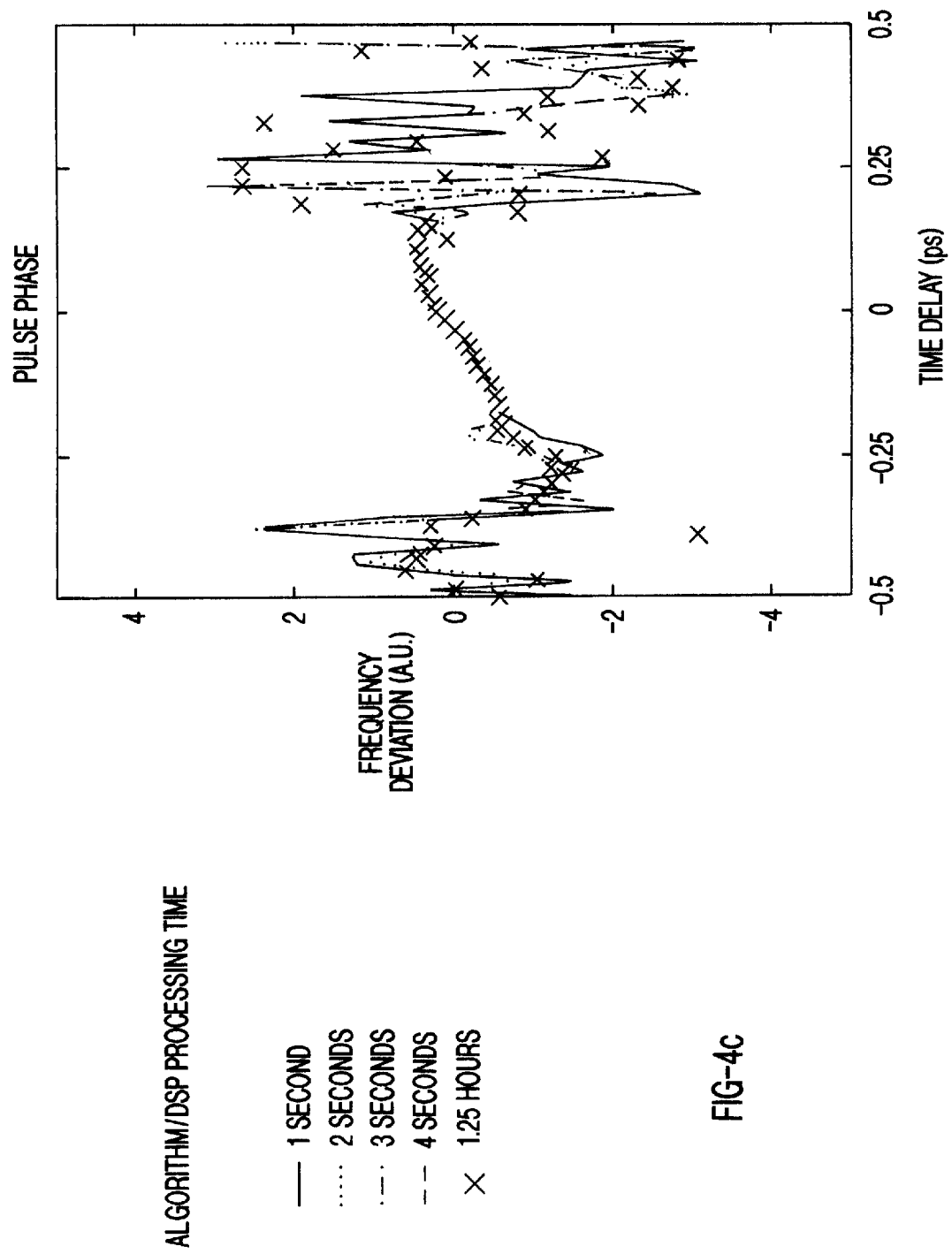
FIG. 4c shows the legend for the pulse and phase plots.
FIG. 4d shows a plot of the phase for the retrieved pulse.

In yet another embodiment, a constraint based on a known gate may be used, such as, when the gate is a known function of the pulse to be measured. While the use of spectral constraints can facilitate inversion of FROG spectrograms, for commercial applications, it is desirable to reduce the complexity of the device. Thus improvements in the PCGP method to permit the inversion of FROG traces rather than blind-FROG traces are advantageous. Assume we have a nonlinear medium that produces a gate from the input pulse via a function we will call $\Gamma$ and its inverse $\Gamma^{-1}$. Rather than using only the outer product of $E_{probe}$ and $E_{gate}$ to produce the next time domain FROG trace, the sum of the outer products of $E_{probe}E_{gate}$ and $\Gamma^{-1}(E_{gate})\Gamma(E_{probe})$ is used so that the outer product on the next iteration is given by $$O_i = probe_i \otimes gate_i + \Gamma^{-1}(gate_i) \otimes \Gamma(probe_i) \quad (21)$$

where $O_i$ is the outer product for the ith iteration, and where $\otimes$ is the outer product operator. In the case of SHG FROG, the function that produces the gate from the probe and its inverse is trivial. For other geometries such as polarization gate, the inverse does not exist. As a result, a pseudoinverse must be constructed. The inverse is constructed from the square root of the gate intensity and the phase of the pulse. Unfortunately, the square root is not a well behaved function. Small fluctuations in the wings of the gate can cause artifacts in the next guess for the pulse that cause instabilities in the method. This can be remedied by applying the square root only in portions of the gate where it is well defined. Where the gate is not well defined, the intensity (and phase) of the pulse is used. This method works well for polarizaton-gate FROG. This type of constructed FROG method works very well for SHG FROG and inverts SHG FROG traces in real time (FIGS. 4). This is fortuitous because it is believed that SHG FROG will be the most commonly used FROG geometry and will be the most important commercially. Furthermore, by placing a filter that has structure and an inverse (i.e., does not attenuate any frequency completely) in one of the beams in the autocorrelator, the time ambiguity in SHG FROG can be removed; consequently, the full pulse characteristics can be determined. However, the outer product function shown in Equation 21 must be changed slightly. In this case, the outer product is given by:

$$O_i = probe_i \otimes \Gamma(probe_i) + \Gamma^{-1}(gate_i) \otimes gate_i \quad (22)$$

where $O_i$ is the ith iteration of the outer product O, $\Gamma$ is the function to transform the probe into the gate, and $\Gamma^{-1}$ is its inverse. In practice, Equation 22 seems to work better than Equation 21. Also, using either only the first part the sum in Equation 22 seems to work as well as using only the last part. The actual best combination of the sum must be determined by trial and error. Also, combinations of Equations 21 and 22 may produce a working method.

One way to assist the methods described is to train a neural net appropriately when the method gets stuck or stagnates. Using a neural network to obtain the pulse or even an initial guess is far to complex. The training sets for such a method are huge. Furthermore, input of the spectrogram or sonogram into the method is a very difficult task. Training a neural net with a 64×64 input matrix is a very difficult task. Although in theory it could be done, with current technology it could take years of training. However, inputting the difference between the data set the method stagnates on and the actual data set is not as complicated a problem. The neural net does not have to be as large, and consequently, will not be as difficult to train. For example, the difference between the data sets could be divided up into a 9×9 grid rather than a 64×64 grid, reducing the complexity of the neural net.

The method of the present invention is useful for any problem requiring the inversion of a spectrogram or sonogram. In order to expand the applicability of PCGPM, we must increase the dimensionality of this method to accommodate spectrograms or sonograms such as those obtained during scanning-tunneling electron microscopy, synthetic aperture radar, or confocal microscopy. Basically, these devices/techniques scan a two-dimensional gate function over a two-dimensional image in two different directions as opposed to a one-dimensional scan in the case of ultrashort pulse measurement. To apply PCGPM to improve resolution of these devices, PCGPM must be converted from a two-dimensional method to a four-dimensional method. Instead of a vector gate being scanned across a vector probe, a gate tensor of rank 2 is scanned in two dimensions across a rank 2 probe tensor. A two-dimension FFT converts the time domain signal to the frequency domain. The result is a rank 4 tensor.

The PCGP method will work as long as: 1) an outer product between the rank 2 probe and gate tensors can be converted to time domain data using a homomorphic transformation (one-to-one), and 2) there exists an eigentensor such that the outer product form tensor multiplied by the eigentensor returns the eigentensor multiplied by a constant. Since a rank one tensor of length $n^2$ may be constructed from an n×n rank 2 tensor, and the rank 4n×n×n×n outer product tensor may be converted to an $n^2 \times n^2$ rank 2 tensor, this is clearly possible. Thus, higher dimension problems may be reduced to lower dimensional problems that look exactly like the FROG inversion problem.

The examples that follow summarize the description of the invention and describe many of the uses. In brief, a spectrogram is produced when a gate samples, in time or space, portions of the signal to be measured for all times or space of interest. The selected portions of the signal are then resolved in frequency. The sampling may be accomplished electronically, optically, electrooptically, or even mechanically. The measured signal is then frequency-resolved and the intensity or magnitude is measured. The result is a series of spectra, one dimensional or higher, one spectra for each portion of the signal sampled. The resulting signal then has no phase information; hence, information about the original signal and/or gate cannot be found directly. The PCGP method previously described is used to recover the phase information so that all of the information about the signal and gate can be determined directly.

The signal of interest may be in any part of the electro-magnetic spectrum, acoustic spectrum, particles (electrons, positrons, protons, nuetrons, etc.), or a material. The gate also be any part of the electro-magnetic spectrum, acoustic spectrum, particles, or a material. However, there must be some physical way for the gate to operate on the signal. Optical examples include any nonlinear optical effect such as sum frequency generation or the optical Kerr effect. Electronic examples include mixers and multipliers. Also, the signal and gate are interchangeable.

A sonogram is produced when the signal to be measured is first resolved or filtered in frequency. Each filtered part of the signal intensity or magnitude is then time resolved. This is done for all frequencies of interest The result is a series of time histories, one dimensional of higher, one time history for each frequency sample. The filtering may be accomplished by a electronic, mechanical, and optical filters (gratings, spectrometers, or fixed filters). Furthermore, the filter does not need to be narrow, it may be quite wide. The PCGP method may then be used to determine the original signal and gate.

Industrial Applicability

The invention is further illustrated by the following non-limiting examples.

Figure 5:
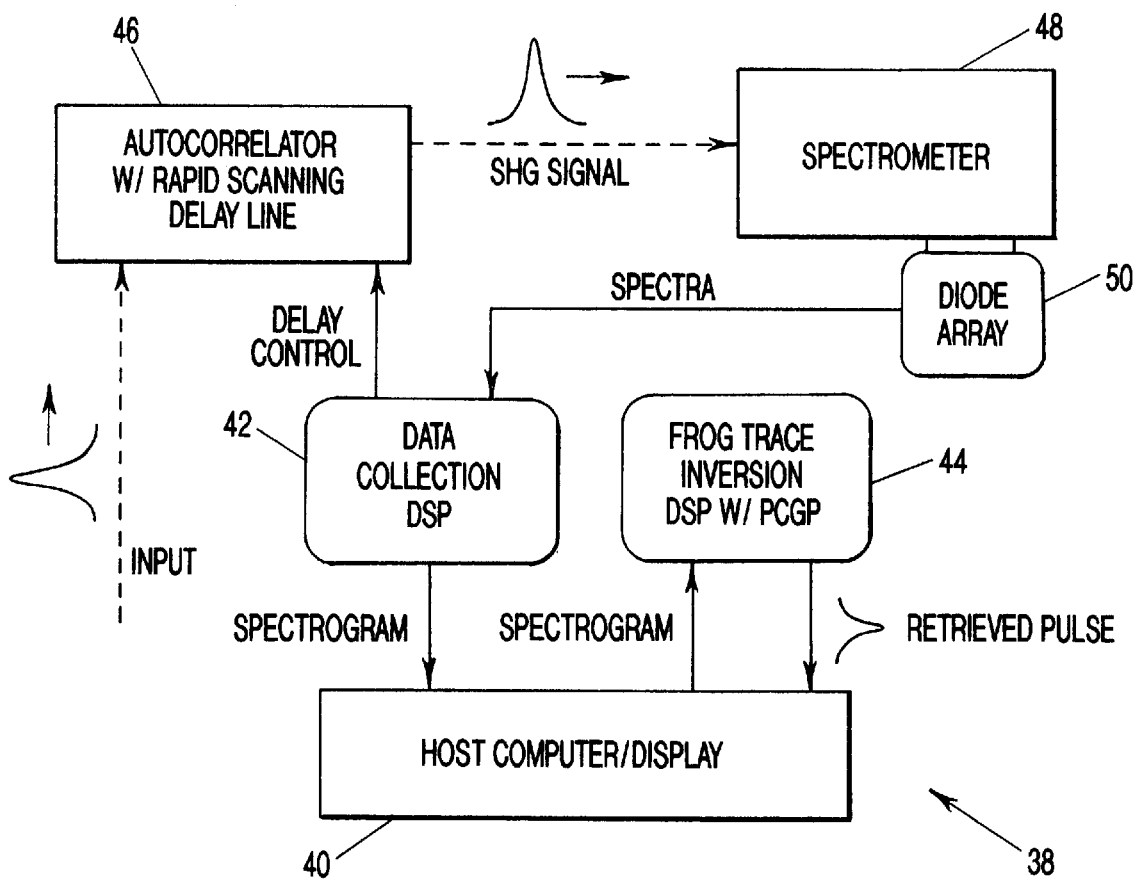
FIG. 5 shows a schematic of the DSP based femtosecond oscilloscope 38. The device uses a host computer 40 with two digital signal processing (DSP) cards 42, 44 based on floating point DSPs. One DSP is used for data acquisition 42 and the other is used for the inversion engine 44. Data originates from an input subject to an autocorrelator 46. The SHG signal from the autocorrelator 46 passes to a spectrometer 48 with a diode array 50. The data acquisition DSP also controls the delay line in the autocorrelator 46 and formats the data (spectrogram in this case) for the inversion engine. The host computer 40 moves the data from the data acquisition board to the inversion engine DSP 44 programmed to run the SHG FROG PCGP method. The method runs at about 20 iterabons/second for a 64×64 FROG trace, and for a 32×32 FROG trace, it runs at about 60 iterations/second. The host computer 40 is also used for user I/O, displaying the FROG trace, and the inverted pulse. With proper synchronization, this device would also be compatible with high repetition rate, amplified, ultrafast lasers.
Figure 6:
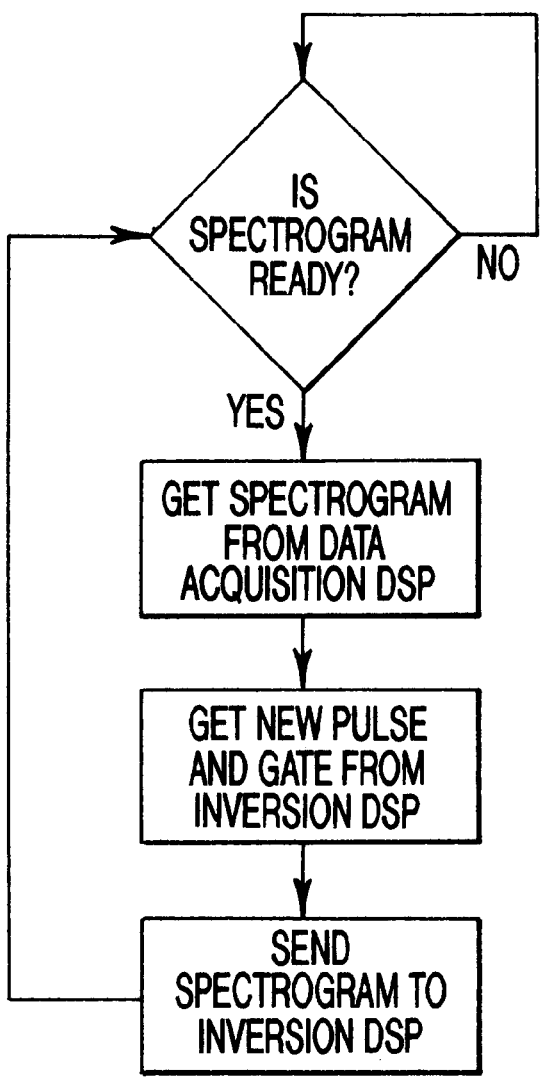
FIG. 6 shows a flow chart of the host control of the DSP boards for the femtosecond oscilloscope shown in FIG. 5. The initial guess for the pulse for the next spectrogram is the result from the previous spectrogram.
Figure 7A:
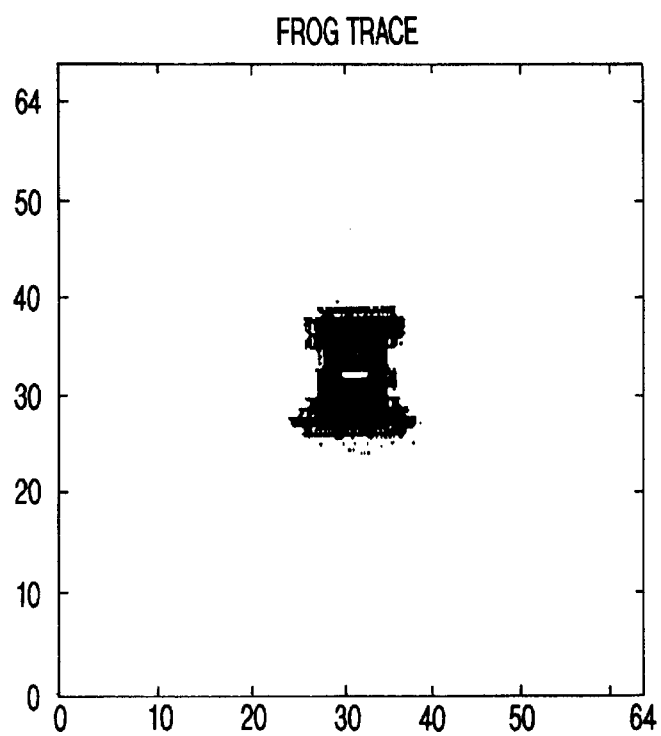
FIG. 7a shows the SHG FROG trace.
Figure 7B:
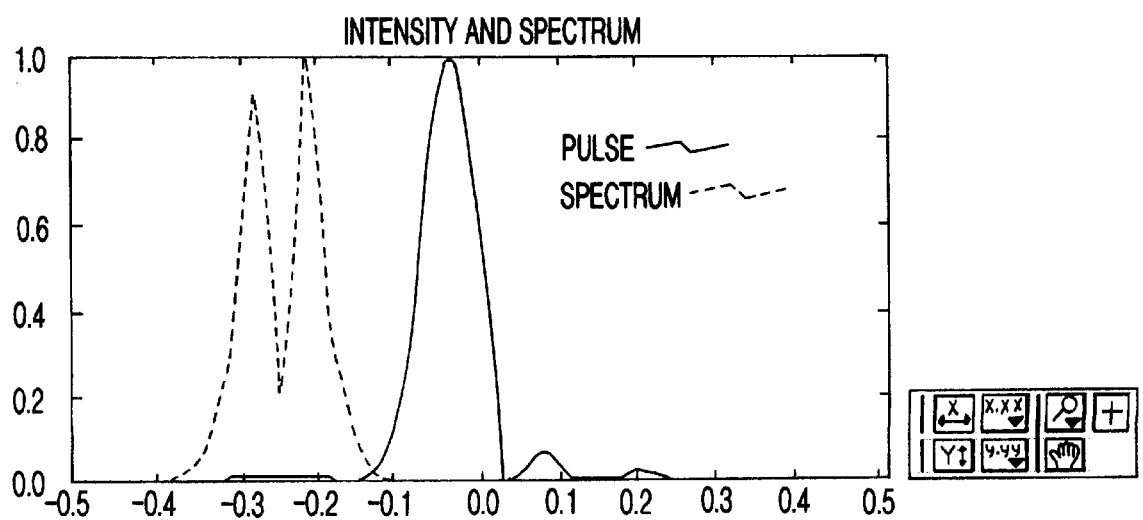
FIG. 7b shows the retrieved pulse and the spectrum.
Figure 7C:
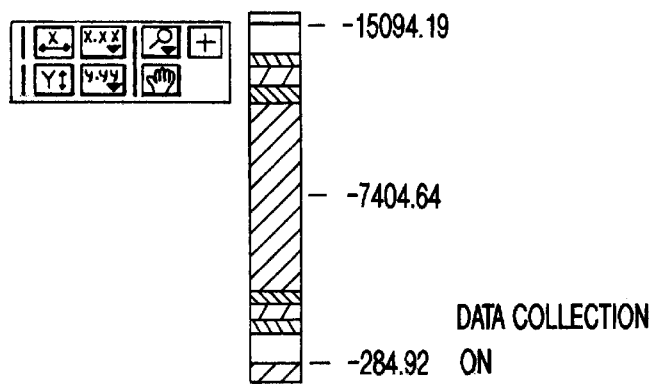
Figure 7D:
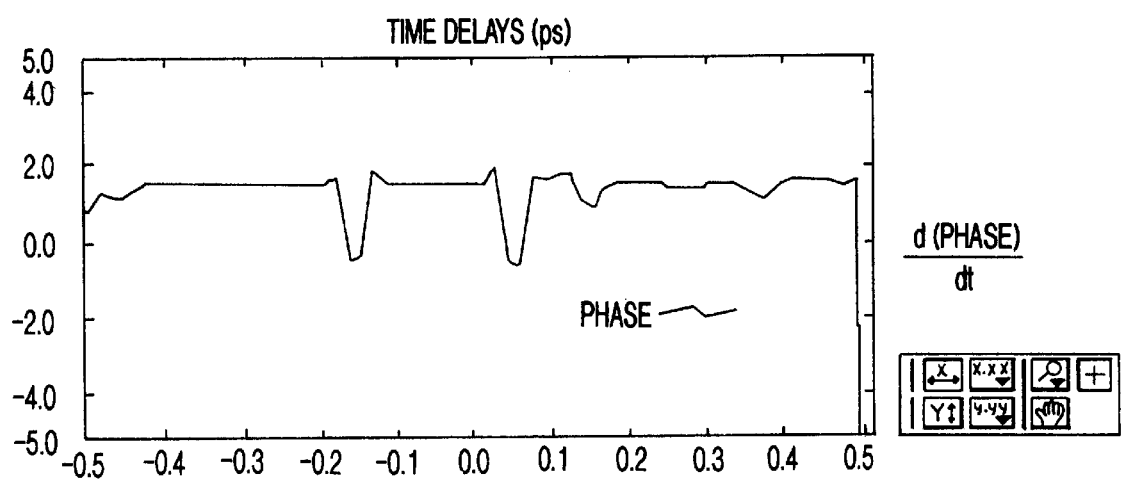
FIG. 7d shows the phase for the pulse shown in FIG. 7b.

The present invention's Femtosecond Oscilloscope uses a multi-shot second harmonic generation FROG device that seamlessly integrates data acquisition and the inversion method by using commercially available digital signal processing (DSP) boards (FIG. 5). This device successfully demonstrated the inversion of experimental FROG traces in real-time and could display the inverted pulses (from a 64×64 FROG trace) at a rate of 1.25 Hz, or one every 0.8 seconds, 2.3 Hz inversion rates were possible for a 32×32 array. Example data obtained using the femtosecond oscilloscope are shown in FIGS. 3. Also show in FIGS. 3 are the retrieved pulse, the retrieved phase, and an example of the performance of the DSP/PCGPM combination. After only one second of computational time, the method ran for 20 iterations on the 64×64 FROG trace, converging to a FROG trace error of less than 0.5%. The method was allowed to continue for another ~90,000 iterations, but this did not significantly change the retrieved pulse and phase.

To further test the femtosecond oscilloscope, a pulse stretcher-compressor was built to vary the pulse dispersion independent from the Ti:sapphire oscillator. The basic configuration of the zero dispersion stretcher/compressor is the same as that used by Chilla and Martinez. At the input of the stretcher/compressor was a 1200 g/mm grating. The first order dispersed light was sent through a 175 mm focal length lens approximately one focal length away. A mirror, also one focal length away, reflected the dispersed light back through the lens onto the grating. By translating the lens, dispersion in the beam could be changed enough to more than triple the pulse width. The femtosecond oscilloscope could easily track these changes. Also, portions of the spectrum could be blocked to shape the pulse before being sent to the FROG device (FIGS. 7).

An SHG FROG device, or spectrally resolved autocorrelator was used in the femtosecond oscilloscope described in this work, although, in principal, virtually any FROG geometry can be used. The input beam is split into two identical beams by a beam splitter. One beam is sent into a manual delay line used to fine tune the delay between the two beams so that the pulse and gate are equivalent for proper operation of the PCGP method. The other beam is sent into a fast scanning delay line. This delay line is a 0.5" diameter retro-reflector controlled by a General Scanning LT 1000 Z (linear) scanner allowing the delay to be controlled by a voltage (~2 mm delay/V). The resulting beams were about 8 mm apart and focused by a 250 mm fl lens into a 200 $\mu$m thick BBO crystal. The spectrum of the second harmonic is measured via a spectrograph and an EG&G Reticon diode array controlled by the EG&G demonstration board. The signal from the diode array electronics was sent into an SRS 560 low noise differential amplifier before being digitized by the 16 bit A/D converters on the data collectfon DSP board. The pixel clock on the diode array controller was set to 100 kHz (exposure of 5 ms), the maximum sample rate of the A/Ds. After the diode array was read, the translation stage was set to the next delay via a D/A on the DSP board. Sixty four spectra were obtained for the 64×64 FROG trace and 32 for the 32×32 FROG trace. Only every other spectra was sampled, resulting in a throughput of 98 spectra/second.

The data collection DSP board also prepared the raw data for input into the method by resampling the signal vector from the 512 element diode array down to 64 pixels using a 15 element FIR digital filter. The coefficients were chosen to remove all frequencies higher than Nyquist for the resampled vector. After filtering, the background from electronics offset and scattered light is subtracted. A host computer (166 MHZ Pentium) controls both DSP boards (FIG. 5). A dynamically-linked library (DLL) was used for host-DSP communication and DSP control allowing the host program to be written in a high level language such as MATLAB or LabVIEW. The host program polls the data acquisition DSP board for a new spectrogram. When ready, the host reads the spectrogram and frees the board to read another spectrogram. The host then reads the new pulse and gate from the inversion engine DSP board running the SHG FROG PCGP method. The new spectrogram is then sent to the inversion engine board. The initial guess used by the method in the inversion DSP for the new spectrogram is the pulse retrieved from the previous spectrogram. The process is repeated indefinitely.

The host program is also responsible for the user interface and display. Since all of the DSP control can be confined to DLLs, the user interface and host control program was written in LabView. The front panel for the test program is shown in FIGS. 7. The FROG trace is shown in the left-hand portion of the figures. The plot in the right-hand corner shows the intensity of the measured pulse and its calculated spectrum. The displayed pulse was formed by placing a wire in the stretcher-compressor to block out the center of the spectrum. Ringing of the pulse intensity caused by the loss of the center frequencies is clearly visible to the right of the pulse. The plot just below the intensity plot shows the phase of the pulse intensity (time domain).

A significant increase in speed is obtained when the power method is applied to PCGPM without any noticeable performance decrease. For SHG FROG, the PCGP method operates about 2–4 times faster than the current generalized projections method while being as robust as the commercially available compound method. Further speed gains can be realized by hand optimization of the PCGPM code. A femtosecond oscilloscope was constructed that obtained SHG FROG traces, and used the improved PCGP method (using the power method) to invert them. The display update of the FROG trace, and the intensity and phase of the pulse, was real time with an update of 0.8 seconds or 1.25 Hz for a 64×64 array (0.43 seconds or 2.3 Hz f a 32 32 array). There is no reason that a similar device could not be constructed using polarization-gate, self-diffraction, third harmonic generation, or any other nonlinear optical mechanism. Also, for an added indication of the pulse intensity and phase, sound can be used.

In this example, a beam of light is reflected from a surface such as an integrated circuit which is referred to as the sample. The reflected light, which constitutes Fraunhofer diffraction (far field diffraction) in the infinite limit (this can be approximated by the use of lenses), along with any diffraction pattern is imaged onto a CCD camera. At the first point, the reflected beam and the diffraction pattern are collected. The beam is then moved to another (x,y) coordinate on the sample and the reflected beam and diffraction pattern are collected. This process is repeated for a grid of N×N points.

The 2-D diffraction pattern is the intensity of the 2-D Fourier transform of the beam interacting with the surface. From the resulting N×N×N×N tensor, all of the information about the sample and the beam is contained. By using the PCGP multidimensional method, the phase profile of the beam of light and the surface can be obtained. That is, the rendering of the surface can be obtained (to the resolution of the original scan step).

The same as the second example, but with light transmission through the sample.

The same as the second example, but with an electron beam rather than a light beam and a phosphor coupled to a CCD camera replacing the CCD camera.

The same as the fourth example, but with an electron beam transmitted through the sample.

The PCGP method is also used to produce a vector spectrum analyzer. Suppose there is a high frequency signal that repeats at some frequency f. If this signal was sent into a mixer with a local oscillator of pulses repeating at f+δ, then the output from the mixer would consist of the high frequency signal with a gate sweeping across it at a frequency of δ. If this signal was sent into a spectrum analyzer to be spectrally resolved, then the output would be a spectrogram of the high frequency signal that would repeat at a frequency of δ. This spectrogram could then be inverted to obtain the intensity and phase of the high frequency signal and the gate.

For a light pulse that is first spectrally resolved by a spectrometer, the output of the spectrometer is sent to a streak camera. The streak camera looks at the time arrival of the different frequencies. The output of the streak camera is a sonogram. By applying the PCGP method on the sonogram, the original light pulse and the spectrometer's resolution function is obtained.

Another example uses PCGPM in process control. A beam of light diffracted from a sample as H moves across the beam is recorded as a function of position. From the recorded intensities, the profile of the sample can be determined. The sample profile can be used to control a process such as etching rate.

Yet another example of the present invention uses PCGPM in manufacturing processes. Wave phenomena interaction data are collected from interactions with a manufacturing process. The wave characteristics of the data contain information relevant to manufacturing process parameters. For instance, parameters such as temperature, composition, water content and concentration are inferred from data analysis. The use of a learning system, expert system, or neural network facilitates implementation of this use of the present invention.

The PCGPM method is also used to generate phase masks for photolithography. The spatial profile of the light source intensity and phase and the phase mask is determined from the desired lithographic pattern by applying the PCGPM.

If a process is amenable to modeling by an invertible transformation, then input vectors are optimizable, and controllable, by the application of the PCGP method. Applications are not limited to purely "physical" phenomena, for example, market trading data, traffic data, and, in general, wave-like is The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for determining characteristics of wave phenomena comprising the steps of:

providing wave phenomena interaction data wherein said data comprises an invertible transform of the product of at least two waves; and determining characteristics using eigenvectors.

2. The method according to claim 1 wherein the determining step comprises using principal component eigenvectors.

3. The method according to claim 1 wherein the determining step comprises solving for eigenvectors using singular value decomposition.

4. The method according to claim 1 wherein the determining step comprises solving for eigenvectors using power methods.

5. The method according to claim 1 wherein the determining step comprises using spectral constraints.

6. The method according to claim 1 wherein the determining step comprises using a neural network.

7. The method according to claim 1 wherein the determining step comprises using an eigentensor.

8. The method according to claim 1 wherein the providing step comprises providing wave phenomena interaction data having gate and probe pulses.

9. The method according to claim 8 wherein the providing step comprises providing wave phenomena interaction data having a time delay between gate and probe pulses.

10. The method according to claim 1 wherein the providing step comprises providing wave phenomena interaction data from a manufacturing process and the method additionally comprises the step of determining manufacturing process parameters from the data.

11. The method according to claim 10 wherein the determining step comprises using a neural network.

12. The method according to claim 10 wherein the determining step comprises determining at least one parameter selected from the group consisting of temperature, composition, water content, and concentration.

13. A method for determining characteristics of wave phenomena comprising the steps of:

providing wave phenomena interaction data;

generating a frequency-resolved optical gating trace from the wave data; and determining characteristics using eigenvectors.

14. An apparatus for measuring characteristics of wave phenomena, said apparatus comprising:

means for generating wave phenomena interaction;

means for measuring wave phenomena interaction; and means for determining information on wave characteristics, wherein said means comprises means for calculating eigenvectors.

15. The apparatus according to claim 14 wherein said means for determining comprises means for calculating principal component eigenvectors.

16. The apparatus according to claim 14 wherein said means for determining comprises means for employing singular value decomposition.

17. The apparatus according to claim 14 wherein said means for determining comprises means for calculating principal component eigenvectors.

18. The apparatus according to claim 14 wherein said means for determining comprises means for employing power methods.

19. The apparatus according to claim 14 wherein said means for determining comprises means for employing a neural network.

20. The apparatus according to claim 14 wherein said means for determining comprises means for calculating an eigentensor.

21. The apparatus according to claim 14 wherein said means for determining comprises means for setting spectral constraints.

* * * * *